United States Patent
Lynch et al.

(10) Patent No.: US 12,543,043 B2
(45) Date of Patent: Feb. 3, 2026

(54) ELECTRONICS MODULE FOR A WEARABLE ARTICLE

(71) Applicant: PREVAYL INNOVATIONS LIMITED, Wilmslow (GB)

(72) Inventors: Michael John Lynch, Manchester (GB); Mantas Jurkuvenas, Manchester (GB)

(73) Assignee: Prevayl Innovations Limited, Wilmslow (GB)

( * ) Notice: Subject to any disclaimer, the term of this patent is extended or adjusted under 35 U.S.C. 154(b) by 0 days.

(21) Appl. No.: 17/792,500

(22) PCT Filed: Jan. 19, 2021

(86) PCT No.: PCT/GB2021/050113
§ 371 (c)(1),
(2) Date: Jul. 13, 2022

(87) PCT Pub. No.: WO2021/148780
PCT Pub. Date: Jul. 29, 2021

(65) Prior Publication Data
US 2023/0039159 A1    Feb. 9, 2023

(30) Foreign Application Priority Data

Jan. 21, 2020 (GB) .................. 2000860
Jul. 31, 2020 (GB) .................. 2011930

(51) Int. Cl.
*H04W 12/33* (2021.01)
*H04W 12/50* (2021.01)
*H04W 76/14* (2018.01)

(52) U.S. Cl.
CPC .......... *H04W 12/33* (2021.01); *H04W 12/50* (2021.01); *H04W 76/14* (2018.02)

(58) Field of Classification Search
CPC ..... H04W 12/33; H04W 12/50; H04W 76/14; H04W 4/023; H04W 12/47; H04W 4/80; H04W 76/10; A41D 1/002
See application file for complete search history.

(56) References Cited

U.S. PATENT DOCUMENTS 8,862,235 B1    10/2014    Stover et al.
9,721,077 B1    8/2017    Daniel
(Continued)

FOREIGN PATENT DOCUMENTS

CN    102752681 A    10/2012
CN    105429663 A    3/2016
(Continued)

OTHER PUBLICATIONS

"Bluetooth®—Bluetooth Core Specification v5.0" Dec. 6, 2016.
(Continued)

*Primary Examiner* — Ankur Jain
(74) *Attorney, Agent, or Firm* — Haley Guiliano LLP

(57) ABSTRACT

An interface (101) is arranged to communicatively couple with an electronics arrangement of the wearable article so as to receive a signal from the electronics arrangement. A controller (103) is communicatively coupled to the interface (101) and arranged to receive the signal from the interface (101). A power source (105) is coupled to the controller (103) and arranged to supply power to the controller (103). A first antenna (107) is arranged to communicatively couple with a mobile device over a first wireless communication protocol. A second antenna (109) is arranged to communicatively couple with the mobile device over a second wireless communication protocol. In response to the mobile device being brought into proximity with the electronics
(Continued)

module (100), the first antenna (107) is triggered to transmit information to the mobile device over the first wireless communication protocol.

19 Claims, 9 Drawing Sheets

(56) References Cited

U.S. PATENT DOCUMENTS

| | | |
|---|---|---|
| 9,837,846 B2 | 12/2017 | Partovi |
| 2002/0124295 A1 | 9/2002 | Fenwick et al. |
| 2007/0109208 A1 | 5/2007 | Turner |
| 2009/0168088 A1 | 7/2009 | Rosenblatt |
| 2009/0270951 A1 | 10/2009 | Kallmyer |
| 2010/0114143 A1 | 5/2010 | Albrecht et al. |
| 2010/0146308 A1 | 6/2010 | Gioscia et al. |
| 2012/0012630 A1 | 1/2012 | Lui et al. |
| 2012/0050153 A1 | 3/2012 | Dvortsov et al. |
| 2012/0153740 A1 | 6/2012 | Soar |
| 2012/0206097 A1 | 8/2012 | Soar |
| 2013/0093389 A1 | 4/2013 | Partovi |
| 2014/0116085 A1 | 5/2014 | Lam |
| 2014/0135593 A1 | 5/2014 | Jayalth et al. |
| 2014/0151079 A1 | 6/2014 | Furui et al. |
| 2014/0225786 A1 | 8/2014 | Lyons |
| 2014/0336896 A1 | 11/2014 | Udaka et al. |
| 2014/0353300 A1 | 12/2014 | Swiatek et al. |
| 2015/0102879 A1 | 4/2015 | Jacobs et al. |
| 2015/0349571 A1 | 12/2015 | Wagman et al. |
| 2015/0364938 A1 | 12/2015 | Lapetina et al. |
| 2016/0036118 A1 | 2/2016 | Baringer et al. |
| 2016/0062417 A1 | 3/2016 | Chu et al. |
| 2016/0071397 A1 | 3/2016 | Logan et al. |
| 2016/0091922 A1 | 3/2016 | Nazzaro et al. |
| 2016/0134961 A1 | 5/2016 | Shaffer |
| 2016/0135743 A1 | 5/2016 | Cobbett et al. |
| 2016/0218414 A1 | 7/2016 | Samardzija et al. |
| 2016/0266606 A1 | 9/2016 | Ricci |
| 2017/0033567 A1 | 2/2017 | Adamisin |
| 2017/0060298 A1 | 3/2017 | Hwang et al. |
| 2017/0070078 A1 | 3/2017 | Hwang et al. |
| 2017/0140333 A1 | 5/2017 | Rinzler et al. |
| 2017/0143063 A1 | 5/2017 | Huff et al. |
| 2017/0325518 A1 | 11/2017 | Poupyrev et al. |
| 2018/0075734 A1 | 3/2018 | Jurkuvenas et al. |
| 2018/0077124 A1* | 3/2018 | Ramoutar ............. H04L 9/0891 |
| 2018/0083474 A1 | 3/2018 | Rajamäki |
| 2018/0085283 A1 | 3/2018 | Rahman |
| 2018/0259914 A1 | 9/2018 | Chae |
| 2018/0262226 A1 | 9/2018 | Erentok et al. |
| 2019/0009097 A1 | 1/2019 | Hartley et al. |
| 2019/0059756 A1 | 2/2019 | Rasmussen et al. |
| 2019/0123431 A1 | 4/2019 | Ehman et al. |
| 2019/0131810 A1 | 5/2019 | Lim et al. |
| 2019/0393730 A1 | 12/2019 | Wittenberg et al. |
| 2020/0015701 A1 | 1/2020 | Wei et al. |
| 2022/0407367 A1 | 12/2022 | Mahmood |

FOREIGN PATENT DOCUMENTS

| | | | |
|---|---|---|---|
| CN | 106911193 | A | 6/2017 |
| CN | 107257150 | A | 10/2017 |
| CN | 110575144 | A | 12/2019 |
| EP | 2 859 839 | A1 | 4/2015 |
| EP | 3 116 244 | A1 | 1/2017 |
| EP | 3332698 | A1 | 6/2018 |
| GB | 2553778 | A | 3/2018 |
| KR | 10 20170138007 | | 12/2017 |
| KR | 10 20170143063 | | 12/2017 |
| WO | 2015/066094 | A2 | 5/2015 |
| WO | 2015134654 | A1 | 9/2015 |
| WO | 2017/006152 | A1 | 1/2017 |
| WO | WO 2017087862 | | 5/2017 |
| WO | 2017/205671 | A1 | 11/2017 |
| WO | WO 2018183038 | | 10/2018 |
| WO | 2019168475 | A1 | 9/2019 |
| WO | 2019/193065 | A1 | 10/2019 |
| WO | 2019213114 | A1 | 11/2019 |
| WO | WO 2020033242 | | 2/2020 |
| WO | WO 2020117559 | | 6/2020 |
| WO | WO-2020197408 | A1 * | 10/2020 ............. G01R 33/02 |

OTHER PUBLICATIONS

"The Qi Wireless Power Transfer System Power Class 0 Specification," Parts 1 and 2: Interface Definitions, Wireless Power Consortium, Version 1.2.3, Feb. 2017.
Chung, M.A. et al., "A Dual-Mode Antenna for Wireless Charging and Near Field communication," IEEE International Symposium on Antennas and Propagation & USNC/URSI National Radio Science Meeting, Jul. 19-24, 2015, pp. 1288-1289.
Clark, S., "NFC Forum unveils technical specification that lets IoT devices use a single antenna for both NFC and wireless charging," retrieved from https://www.nfcw.com/2019/01/16/359023/nfc-forum-technical-specification-single-antenna-nfc-and-wireless-charging/, Jan. 16, 2019.
Jimblom, "Bluetooth Basics," Published on sparkfun.com, archived on May 5, 2019 by the internet archive archive.org, available at here: https://web.archive.org/web/20190505203555/https://learn.sparkfun.com/tutorials/bluetooth-basics/how-bluetooth-works (2019).
Johns, B., "An Introduction to the Wireless Power Consortium standard and TI's compliant solution," Analog Application Journal Texas Instruments Incorporated, (2011), pp. 10-12.
Schmallegger, NXP Semiconductors, Wireless charging, NFC or Qi for wearables? Jun. 26, 2019 Wireless Charging: NFC or Qi for Wearables?—Power Management—Elektroniknet.
GB Combined Search Report and Examination Report dated Mar. 26, 2020 of GB Application 1915658.7.
GB Search Report of GB Application No. 2212037.2 dated Nov. 22, 2022.
International Search Report and Written Opinion of PCT/GB2020/052722 dated Jan. 12, 2021.
U.S. Appl. No. 17/765,724, filed Mar. 31, 2022, Tahir MahMood.
$2^{nd}$ Examination Report of GB 2109912.2 dated Dec. 13, 2021.
$3^{rd}$ Examination Report of GB 2109912.2 dated Feb. 15, 2022.
$4^{th}$ Examination Report of GB 2109912.2 dated Mar. 21, 2022.
$5^{th}$ Examination Report of GB 2109912.2 dated May 30, 2022.
GB Combined Search and Examination Report of GB Application 20000860.3 dated Aug. 25, 2020.
GB Combined Search and Examination Report of GB 2109912.2 dated Nov. 9, 2021.
International Search Report and Written Opinion of PCT/GB2021/050113 dated Apr. 19, 2021.
Air-Charge—Nike launches the Nike Adapt BB, first shoe with wireless charging capabilities (air-charge.com) Jan. 21, 2019 https://www.air-charge.com/news/204/19/Nike-launches-the-Nike-Adapt-BB-first-shoe-with-wireless-charging-capabilities.
Benedict, "IB14: RPM2 Power Meter Shoe Insole Inserts Measure Force Everywhere," *1814: RPM2 Power Meter Shoe Insole Inserts Measure Force Everywhere—Bikerumor* Posted on Oct. 19, 2014.
Kaitsi et al., "Clinical assessment of a non-invasive wearable MEMS pressure sensor array for monitoring of arterial pulse waveform, heart rate and detection of atrial fibrillation," Digital Medicine, Scripps Research Translational Institute, published online May 14, 2019.
Kaneko et al. "Pulse wave measurement in human using piezoresistive cantilever on liquid," Conference Paper in Proceedings of the IEEE International Conference on Micro Electro Mechanical Systems (MEMS) Jan. 2015.
Mearian, "Wireless charging explained: What is it and how does it work?" Mar. 28, 2018.
Search Report of GB Application 2011930.1 dated Jun. 23, 2021.
Sun et al., "Wearable pulse wave monitoring system based on MEMS sensors," Micromachines, 9, 90 (2018) (10 pages).
Trenholm, MediaTek 361 smart shoe release date, news, price and spec—CNET, Mar. 5, 2015.

(56) References Cited

OTHER PUBLICATIONS

Xu et al., Validation of a piezoelectric sensor array-based device for measurement of carotid-femoral pulse wave velocity: The Philips Prototype, Pulse, 5:161-168 (2017).
Flex Circuit Design Guide, Technical Specification FC302, Minco Flex Circuits, 2006 (30 pages).
Flex-Rigid Design Guide, Circuit Board Technology, Wurth Elektronik GmbH & Co. KG, Version 1.2, Mar. 2018 (8 pages).
"Molex and NuCurrent Powerlife Wireless Charging Coils | Featured Product Spotlight," Mouser Electronics, available online at <https://web.archive.org/web/20190609184755/https://www.allaboutcircuits.com/new-industry-products/molex-nucurrent-powerlife-wireless-charging-coils-featured-product-spotligh/>, Jul. 20, 2017, 5 pages.

\* cited by examiner

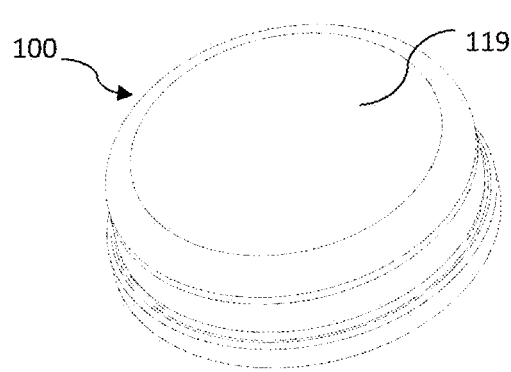
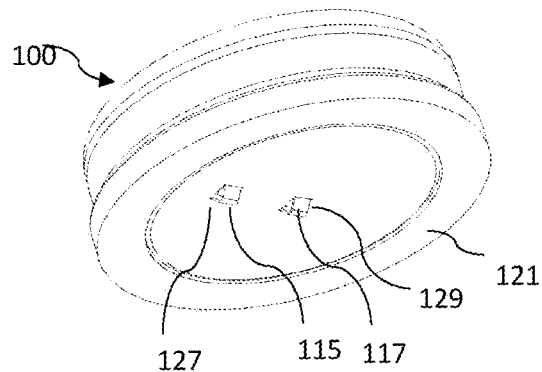
FIG. 8  FIG. 9
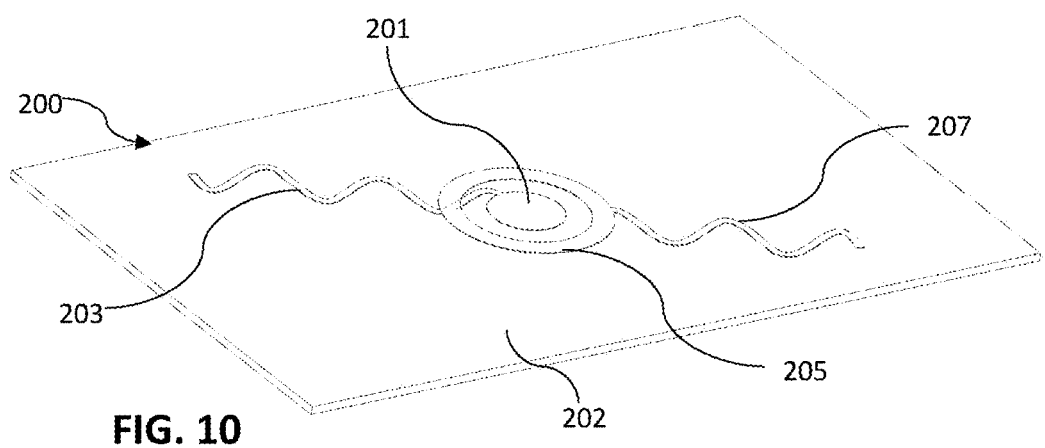
FIG. 10
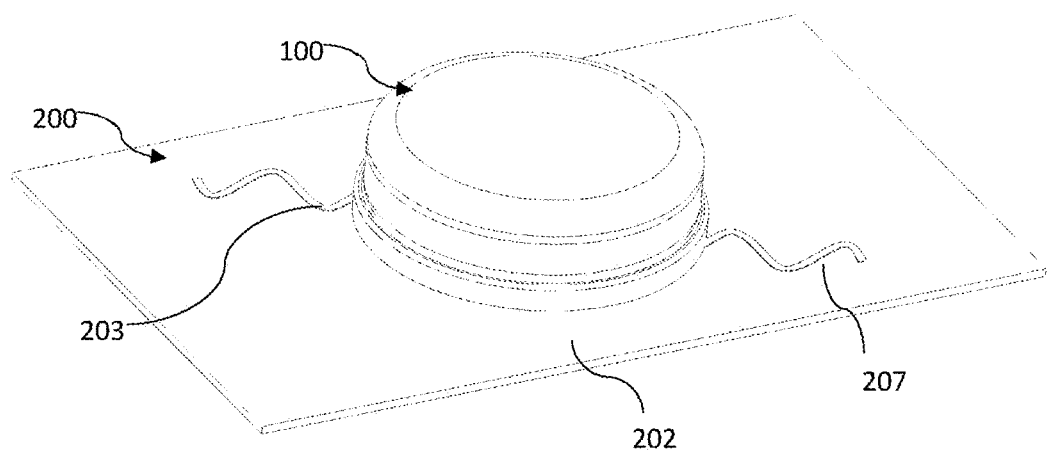
FIG. 11

ELECTRONICS MODULE FOR A WEARABLE ARTICLE

CROSS-REFERENCE TO RELATED APPLICATIONS

This application is a national stage application under 35 U.S.C. § 371 of International Application PCT/GB2021/050113, filed Jan. 19, 2021, which claims priority of GB Patent Applications 2000860.3, filed Jan. 21, 2020, and 2011930.1, filed Jul. 31, 2020. The disclosures of which are hereby incorporated by reference herein in their entireties.

The present invention is directed towards an electronics module for a wearable article and, in particular, an electronics module arranged to transmit information to a mobile device such as for use in wireless pairing the electronics module to the mobile device.

BACKGROUND

Electronics modules for wearable articles such as garments are known to communicate with mobile devices over wireless communication protocols such as Bluetooth® and Bluetooth® Low Energy. These electronics modules are typically removably attached to the wearable article, interface with internal electronics of the wearable article, and comprise a Bluetooth® antenna for communicating with the mobile device. To pair the electronics module to the mobile device, the user of the mobile device must first select the appropriate electronics module from a potentially long list of devices on a user interface of the mobile device. This may be challenging for the user particularly if there are many Bluetooth® devices in communication range with the mobile device.

Outside of the field of electronics modules for wearable articles, it is known to use near-field communication technologies to enhance the user experience of applications that use Bluetooth® technology. In particular, the publication "Bluetooth® Secure Simple Pairing Using NFC" which was published by the Bluetooth® Special Interest Group of the NFC forum on 9th January 2014 describes that NFC can be used to enhance the selection of Bluetooth® devices, the secure connection of Bluetooth® devices and the initialisation of applications on Bluetooth® devices. The disclosures of this document are hereby incorporated by reference.

It is an object of the present disclosure to provide an electronics module for a wearable article that facilitates a more seamless wireless user experience and which minimises the amount of interaction required by the user via an interface of a mobile device to facilitate communication between the mobile device and the electronics module.

It is another object of the present disclosure to provide an electronics module for a wearable article with a structure that facilitates the transfer of power and/or data between the electronics module and an external device.

SUMMARY

According to the present disclosure there is provided an electronics module, wearable article, system, and method as set forth in the appended claims. Other features of the invention will be apparent from the dependent claims, and the description which follows.

According to a first aspect of the present disclosure, there is provided an electronics module for a wearable article. The electronics module comprises an interface arranged to communicatively couple with an electronics arrangement of the wearable article so as to receive a signal from the electronics arrangement. The module comprises a controller, communicatively coupled to the interface, and arranged to receive the signal from the interface. The module comprises a power source, coupled to the controller, and arranged to supply power to the controller. The module comprises a first antenna arranged to communicatively couple with a mobile device over a first wireless communication protocol. The module comprises a second antenna arranged to communicatively couple with the mobile device over a second wireless communication protocol. In response to the mobile device being brought into proximity with the electronics module, the first antenna is triggered to transmit information to the mobile device over the first wireless communication protocol.

The electronics module may be configured to trigger/energize the first antenna to transmit information to the mobile device over the first wireless communication protocol. Terms such as trigger and energize as used throughout this specification are intended to have the same meaning and generally refer to the first antenna being initiated, caused, enabled or otherwise activated to transmit information to the first wireless communication protocol. These examples may but are not required to mean that the electronics module induces a current in the first antenna to cause the first antenna to actively transmit the information. The current may be induced by the mobile device as explained in more detail below. The current may be induced by a combination of the mobile device and the electronics module. This is typically provided in dynamic tags where the antenna of the tag is not configured to transmit fixed information but is rather controlled by the controller to transmit information obtained from a memory of or accessible by the controller. In such examples, the mobile device may induce a main current in the first antenna while a smaller, varying, current is induced in the first antenna by the controller to enable the identifier to be transmitted. The current may be induced solely by the electronics module. That is, the mobile device may not have an antenna arranged to induce a current in the first antenna. The electronics module typically has its own power source (e.g. a battery) which can be used to induce current in the first antenna.

The electronics module may be arranged to detect the mobile device being brought into proximity with the electronics module, and in response thereto, trigger the first antenna to transmit information to the mobile device over the first wireless communication protocol. In this way, the electronics module actively detects the presence of the mobile device and triggers the first antenna to transmit the information over the first wireless communication protocol in response thereto. This enables electronics module to transmit a greater variety of information of the first wireless communication protocol than purely passive approaches which use purely passive communication such as passive NFC tags. Passive NFC tags can also increase manufacturing and installation costs by requiring the information desired to be transmitted to be written to the NFC tag prior to installing the NFC tag. This is not practical in large scale applications. Moreover, the approach of triggering the transmission of information in response to the mobile device being brought into proximity with the electronics module reduces power consumption compared to always on communication systems such as active NFC tags as the first antenna is not always triggered to transmit information. In this way, the approach of the present disclosure provides for greater flexibility in information exchange without a dramatic increase in power consumption. The first wireless communication protocol may be a near field communication protocol.

The second wireless communication protocol may have a longer communication range than the first wireless communication protocol The information may comprise a unique identifier for the electronics module. The unique identifier for the electronics module may comprise an address for the electronics module such as a MAC address or Bluetooth® address or a component of such an address. Beneficially, transmitting a unique identifier for the electronics module removes the need for a discovery or inquiry procedure to establish a communication session under the second wireless communication protocol. That is, a user is no longer required to select the desired electronics module from a potentially long list of devices displayed on an interface of the mobile device.

The information may comprise authentication information used to facilitate the pairing between the electronics module and the mobile device over the second wireless communication protocol. This means that the transmitted information is used as part of an out of band (OOB) pairing process or other form of similar pairing process. OOB pairing and similar pairing methods involve exchanging security information such as cryptographic keys and confirmation values over the first wireless communication protocol (e.g. near field communication, NFC) so as to facilitate the pairing over the second wireless communication protocol (e.g. Bluetooth®). This approach allows for a larger cryptographic key to be used than other non-OOB techniques. Moreover, as the communication range of the first wireless communication protocol (e.g. NFC) is generally very limited, it reduces the risk of another device eavesdropping on the communication and thus enhances security.

The information may comprise application information which may be used by the mobile device to start an application on the mobile device or configure an application running on the mobile device. The application may be started on the mobile device automatically (e.g. without user input). Alternatively, the application information may cause the mobile device to prompt the user to start the application on the mobile device. These approaches provide an enhanced user experience as manual identification and operation of the application on the mobile device is not required. The information may comprise a uniform resource identifier such as a uniform resource location to be accessed by the mobile device, or text to be displayed on the mobile device for example. For example, the application information may cause an application associated with the wearable article to run on the mobile device. The application may be used to manage, process, and/or display data received from the wearable article. The application information may comprise information relating to the properties of the wearable such as the type of wearable article (e.g. a T-shirt) and the available sensors of the wearable article (e.g. ECG sensors). This information may be used to configure the application running on the mobile device such as by populating graphs on the mobile device to reflect the type of wearable article and available sensors. This allows the application to be configured while waiting for the paring between the electronics module and the mobile device to be completed.

The information may comprise a unique identifier for the electronics module. In response to receiving the unique identifier, the mobile device may transmit a pairing request message to the electronics module. This message may be transmitted over the second wireless communication protocol, but this is not required and the first wireless communication protocol may also be used, and may use the address for the electronics module as indicated by the received unique identifier. The second antenna of the electronics module may be arranged to receive the pairing request message over the second wireless communication protocol, but this is not required and the first antenna and first wireless communication protocol may also be used. The controller of the electronics module may be arranged to control the second antenna to transmit a pairing response message to the mobile device, but this is not required and the first antenna may also transmit the pairing response message. Once the pairing request and pairing response messages have been exchanged, the electronics module and mobile device may commence pairing. The pairing may be performed using any example pairing method such as Just Works™, OOB pairing, or passkey pairing. Preferred implementations use OOB pairing. In this way, the first antenna of the electronics module is advantageously used to exchange the unique identifier and authentication information for use in pairing the electronics module to the mobile device. This simplifies the pairing process and improves the user experience as required user inputs to the mobile device are minimised.

The information may comprise authentication information. The authentication information may be used to facilitate the pairing between the electronics module and the mobile device over the second wireless communication protocol. The authentication information may be used for securing communications between the electronics module and the mobile device over the second wireless communication protocol. The authentication information may comprise a passkey.

The passkey may have any length as selected as appropriate by the skilled person. In examples, the passkey may have a length of 2 or more characters, 4 or more characters, 6 or more characters, 8 or more characters, 10 or more characters, 12 or more characters, 14 or more characters, or 16 or more characters. The passkey may have a length of less than or equal to 32 characters, less than or equal to 28 characters, less than or equal to 24 characters, less than or equal to 20 characters, or less than or equal to 16 characters In some examples, the first antenna may be triggered to transmit information to the mobile device over the first wireless communication protocol in response to a current being induced in the first antenna. The current is induced in the first antenna as a result of the mobile device being brought into proximity with the electronics module. The mobile device may comprise an active antenna to induce the current in the first antenna. An induced current in the first antenna may cause the controller of the electronics module to wake-up from a low power mode and trigger the first antenna to transmit the information. The controller may energize the first antenna such as by inducing a current in the first antenna to enable the first antenna to transmit the information. In these examples, the first antenna functions as a sensor arranged to detect the mobile device being brought into proximity with the electronics module. Moreover, since the mobile device induces the main field into the first antenna, the electronics module may only need to supply a limited amount of current to the first antenna to effect the transmission of the information.

The electronics module may further comprise a sensor. The sensor may be arranged to detect the mobile device being brought into proximity with the electronics module. In response to the sensor detecting the mobile device being brought into proximity with the electronics module, the controller may trigger the first antenna to transmit the information (such as the unique identifier) to the mobile device over the first wireless communication protocol. The controller may energize the first antenna such as by inducing a current in the first antenna to enable the first antenna to transmit the information. The sensor may be a motion sensor arranged to detect a displacement of the electronics module caused by the mobile device being brought into proximity with the electronics module. That is, the sensor may be able to detect a "tap" input caused by the mobile device being tapped against the electronics module or a pocket or other holder in which the electronics module is located. The sensor is not required to be a motion sensor. Other forms of sensor such as capacitive sensors, optical sensors, and ultrasound sensors may be used to detect a mobile device being brought into proximity with the electronics module. as Advantageously, motion sensors can be utilised for additional tasks such as recognising and classifying motion activities (e.g. running, walking, swimming, cycling) performed by a user wearing the wearable article.

In response to the sensor detecting the mobile device being brought into proximity with the electronics module, the controller may be arranged to transition from a low power mode to a normal power mode. Beneficially, prior to the sensor detecting a mobile device being brought into proximity with the electronics module, components of the electronics module such as the controller, the first antenna and second antenna may be operating in a low power mode. This may mean that they are not supplied with power or only supplied with a minimal amount of power such as for refreshing an internal memory. This reduces unnecessary power consumption for the electronics module. Once the mobile device is brought into proximity with the electronics module, the sensor may cause the controller to wake-up and energize/control the first antenna.

In an example implementation, when the sensor detects a mobile device being brought into proximity with the electronics module, the sensor sends an interrupt signal to the controller. This causes the controller to wake-up.

In response to the mobile device being brought into proximity with the electronics module, the controller may be arranged to generate a passkey for securing communications between the electronics module and the mobile device over the second wireless communication protocol. The electronics module may be configured to transmit the passkey after receiving a request from the mobile device over the first wireless communication protocol. The passkey may be a random code generated by the electronics module. The passkey may be a random number. That is, the electronics module/controller may comprise a random number generator for generating the passkey.

The electronics module may be arranged to encrypt data transmitted over the second wireless communication protocol to the mobile device using the passkey. The data may relate to sensor data monitored by the wearable device. The electronics module may be arranged to decrypt data received from the mobile device over the second wireless communication protocol using the passkey.

In response to the mobile device being brought into proximity with the electronics module, the first antenna may be triggered to transmit an identifier for the electronics module to the mobile device over the first wireless communication protocol, wait for the transmission of a request message from the mobile device over the first wireless communication protocol, and transmit a passkey to the mobile device over the first wireless communication protocol in response to receiving the request message. The passkey may be generated by the controller in response to the mobile device being brought into proximity with the electronics module.

The second antenna may be arranged to receive a bonding request from the mobile device. In response to receiving the bonding request, the electronics module may be arranged to store the authentication information/passkey for use in future communication sessions with the mobile device over the second wireless communication protocol. The electronics module may also initiate the bonding by controlling the second antenna to transmit a bonding request to the mobile device.

The second antenna may be arranged to receive a request from the mobile device to delete the passkey, the electronics module may be arranged to delete or not store the authentication information/passkey.

In response to the mobile device being brought into proximity with the electronics module, the controller may be arranged to read information from a memory accessible by the controller and cause the first antenna to transmit the information over the first wireless communication protocol.

The electronics module may further comprise a housing. The housing may comprise a top enclosure and a bottom enclosure. The bottom enclosure may be closest to the wearable article/skin of the user wearing the article in use. The top enclosure may be furthest from the wearable article/skin of the user wearing the article in use. The power source, controller, first antenna and second antenna may be provided in the housing such as by being provided in the volume enclosed by the housing. The first antenna may be provided proximate to the top enclosure. Beneficially, providing the first antenna proximate to the top enclosure minimises the communication distance between the mobile device and the first antenna. This is particularly beneficial when the first wireless communication protocol is a short-range communication protocol such as NFC. A longitudinal axis extends from the top enclosure to the bottom enclosure. The first antenna may be spaced apart from the power source, controller, and second antenna along the longitudinal axis of the housing.

The first antenna may comprise an aperture. The second antenna and the first antenna may be arranged such that the second antenna has line of sight through the aperture. The electronics module may further comprise a printed circuit board, wherein the controller and the second antenna may be provided on the printed circuit board.

The electronics module may further comprise a light source. The electronics module may further comprise a printed circuit board. The controller and the light source may be provided on the printed circuit board. The first antenna may comprise an aperture. The light source and the first antenna may be arranged such that the light source has line of sight through the aperture.

The electronics module may comprise a printed circuit board structure comprising a first printed circuit board. The first antenna may be provided on the first printed circuit board. The printed circuit board structure may further comprise a second printed circuit board. The controller and the second antenna may be provided on the second printed circuit board. A conductor may extend from the first printed circuit board to the second printed circuit board to conductively connect the first printed circuit board to the second printed circuit board. The printed circuit board structure may be a flex-rigid printed circuit board structure. The first and second printed circuit boards may be rigid components of the flex-rigid printed circuit board structure. The conductor may be a flexible component of the flex-rigid printed circuit board structure. The first and second printed circuit boards may form a single, integral, structure, or may be separate components. The conductor may be separate to the first and second printed circuit boards. The conductor may be integral with one or both of the printed circuit boards. The first printed circuit board may be a flexible printed circuit board. The second printed circuit board may be a rigid printed circuit board. The conductor portion connecting the first and second printed circuit boards may comprise a stiffener material.

The first printed circuit board may comprise a first region bounding an aperture extending through the first printed circuit board. The first antenna may be arranged in the first region of the first printed circuit board.

The first communication protocol may be a near-field communication protocol. The second communication protocol may be a Bluetooth®, Bluetooth® Low Energy, Wi-Fi®, Bluetooth® Mesh, Bluetooth® 5, Thread, Zigbee®, IEEE 802.15.4, Ant, or Ant+ communication protocol.

The present disclosure is not limited to these examples and other first and second communication protocols may be used. Generally, the second communication protocol will have a longer communication range and a faster data transfer rate than the first communication protocol.

The interface may not be required for all aspects of the present disclosure. That is, the wearable article may not be required to include an electronics arrangement and the electronics/sensing components may be self-contained within the electronics module.

According to a second aspect of the disclosure, there is provided a wearable article comprising the electronics module of the first aspect of the disclosure. The wearable article may comprise a garment. The garment may comprise a holder for the electronics module. The holder may comprise a pocket. The electronics module may be arranged to be disposed within the pocket of the garment. The pocket may be an external pocket provided on an external surface of the garment. The pocket may be an internal pocket.

The wearable article may comprise one or more sensing components. The sensing components may be biosensing components. The sensing components may comprise one or more components of a temperature sensor, a humidity sensor, a motion sensor, an electropotential sensor, an electroimpedance sensor, an optical sensor, and/or an acoustic sensor. Here, "component" means that not all of the components of the sensor may be provided in the wearable article or are required to be provided in the wearable article. The processing logic, power and other functionality may be provided in the electronics module. The wearable article may only comprise the minimal functionality to perform the sensing such as by only including sensing electrodes. The temperature sensor may be arranged to measure an ambient temperature, a skin temperature of a human or animal body, or a core temperature of a human or animal body. The humidity sensor may be arranged to measure humidity or skin-surface moisture levels for a human or animal body. The motion sensor may comprise one or more of an accelerometer, a gyroscope, and a magnetometer sensor. The motion sensor may comprise an inertial measurement unit. The electropotential sensor may be arranged to perform one or more bioelectrical measurements. The electropotential sensor may comprise one or more of electrocardiography (ECG) sensor modules, electrogastrography (EGG) sensor modules, electroencephalography (EEG) sensor modules, and electromyography (EMG) sensor modules. The electroimpedance sensor may be arranged to perform one or more bioimpedance measurements. Bioimpedance sensors can include one or more of plethysmography sensor modules (e.g., for respiration), body composition sensor modules (e.g., hydration, fat, etc.), and electroimpedance tomography (EIT) sensors. An optical sensor may comprise a photoplethysmography (PPG) sensor module or an orthopantomogram (OPG) sensor module.

According to a third aspect of the disclosure, there is provided a system. The system comprises the electronics module of the first aspect of the disclosure and a mobile device. The mobile device is arranged to be brought into proximity with the electronics module and is arranged to receive the information from the electronics module over the first wireless communication protocol.

The mobile device may be a mobile phone, smart phone, tablet computer, personal computer, gaming system, MP3 player, head mounted display, or other form wearable device such as a smart watch. The mobile device may be any mobile device operable to communicate with the electronics module over first and second wireless communication protocols.

According to a fourth aspect of the disclosure, there is provided a method of communicating between an electronics module for a wearable article and a mobile device. The method comprises providing the electronics module of the first aspect of the disclosure. The method comprises triggering/energizing a first antenna of the electronics module to transmit information to the mobile device over a first wireless communication protocol in response to a mobile device being brought into proximity with the electronics module.

According to a fifth aspect of the disclosure, there is provided an electronics module for a wearable article. The electronics module comprises a controller configured to process signals received from a sensing component. The sensing component may be part of the electronics module and/or part of the wearable article. The electronics module comprises a power source, coupled to the controller, and arranged to supply power to the controller. The electronics module comprises a first antenna. The electronics module comprises a housing comprising a top enclosure and a bottom enclosure, and a longitudinal axis extending from the top enclosure to the bottom enclosure. The power source, controller, and antenna are provided in the housing. The first antenna is provided proximate to the top enclosure.

Beneficially, providing the first antenna proximate to the top enclosure minimises the communication distance between the mobile device and the first antenna. This is particularly beneficial when the first wireless communication protocol is a short-range communication protocol such as NFC. This is also useful when the first antenna is not used for communication. For example, the first antenna may be a power receiving antenna such as power receiving coil. Minimising the distance between the first antenna and the power transmitter (e.g. a mobile device) increases the effectiveness of the transfer of power to the electronics module. Therefore, the electronics module has a structure that facilitates the transfer of power and/or data between the electronics module and an external device.

The electronics module may comprise some or all of the features disclosed above in relation to the first aspect of the disclosure. The electronics module may be useable in the wearable article of the second aspect of the disclosure, the system of the third aspect of the disclosure, or the method of the fourth aspect of the disclosure.

According to a sixth aspect of the disclosure, there is provided a garment. The garment comprises an electronics module holder arranged to at least temporarily hold an electronics module. The garment comprises an electronics module comprising: a controller arranged to receive a signal from a sensing component of the garment; a power source, coupled to the controller, and arranged to supply power to the controller; a first antenna arranged to communicatively couple with a mobile device over a first wireless communication protocol; and a second antenna arranged to communicatively couple with the mobile device over a second wireless communication protocol, wherein, in response to the mobile device being brought into proximity with the electronics module, the first antenna is energized/triggered to transmit information to the mobile device over the first wireless communication protocol. The electronics module may be configured to energize/trigger the first antenna to transmit information to the mobile device over the first wireless communication protocol.

The sensing component may be part of the electronics module and/or may be separate to the electronics module.

The electronics module may comprise some or all of the features disclosed above in relation to the first aspect of the disclosure. The garment may comprise some or all of the features disclosed above in relation to the wearable article of the second aspect of the disclosure, and may be useable in the system of the third aspect of the disclosure, or the method of the fourth aspect of the disclosure.

According to a seventh aspect of the disclosure, there is provided an electronics module for a wearable article. The electronics module comprising a controller. The electronics module comprises a power source coupled to the controller and arranged to supply power to the controller. The electronics module comprises a first antenna arranged to communicatively couple with a mobile device over a first wireless communication protocol; and a second antenna arranged to communicatively couple with the mobile device over a second wireless communication protocol. In response to the mobile device being brought into proximity with the electronics module, the controller generates a passkey and the first antenna is triggered to transmit the passkey to the mobile device over the first wireless communication protocol.

The electronics module may comprise some or all of the features disclosed above in relation to the first aspect of the disclosure. The electronics module may be useable in the wearable article of the second aspect of the disclosure, the system of the third aspect of the disclosure, or the method of the fourth aspect of the disclosure.

According to an eighth aspect of the disclosure, there is provided a mobile device. The mobile device comprises: a controller; a power source, coupled to the controller, and arranged to supply power to the controller; a first antenna arranged to communicatively couple with an electronics module over a first wireless communication protocol; and a second antenna arranged to communicatively couple with the electronics module over a second wireless communication protocol. The first antenna is configured to receive an identifier for the electronics module and a passkey from the electronics module over the first wireless communication protocol. The second antenna is configured to receive data from the electronics module over the second wireless communication protocol. The data is encrypted using the passkey. The controller is configured to decrypt the received sensor data using the passkey.

According to a ninth aspect of the disclosure, there is provided a method of communicating between a first device and a second device. The method comprises the first device transmitting a device identifier to the second device over a first wireless communication protocol in response to the second device being brought into proximity with the first device. The method comprises the second device transmitting a pairing request message to the first device over the first wireless communication protocol in response to receiving the device identifier. The method comprises the first device transmitting a passkey to the second device over the first wireless communication protocol in response to the first device receiving the pairing request message. The method comprises the first device and the second device pairing with one another over the second wireless communication protocol. The method comprises the first device and the second device communicating with one another over the second wireless communication protocol. The communication over the second wireless communication protocol is encrypted using the passkey exchanged between the first device and the second device.

The first device may be the electronics module for a wearable article such as the electronics module according to the first aspect of the disclosure. The second device may be a mobile device.

According to a tenth aspect of the disclosure, there is provided a method of communicating between a first device and a second device. The method comprises the first device transmitting a device identifier to the second device over a first wireless communication protocol in response to the second device being brought into proximity with the first device. The method comprises the second device comparing the transmitted device identifier to one or more device identifiers received by the second device over a second wireless communication protocol. If the transmitted device identifier corresponds to one of the device identifiers received over the second wireless communication protocol, the method comprises the second device transmitting a pairing request message to the first device over the first wireless communication protocol. The method comprises the first device transmitting a passkey to the second device over the first wireless communication protocol in response to the first device receiving the pairing request message. The first device and the second device pairing with one another over the second wireless communication protocol. The first device and the second device communicating with one another over the second wireless communication protocol, wherein the communication over the second wireless communication protocol is encrypted using the passkey exchanged between the first device and the second device.

The first device may be the electronics module for a wearable article such as the electronics module according to the first aspect of the disclosure. The second device may be a mobile device.

The second device may automatically discover the first device over the second wireless communication protocol so as to obtain a device identifier for the first device.

The present disclosure is not limited to wearable articles. The electronics modules disclosed herein may be incorporated into other forms of devices such as user electronic devices (e.g. mobile phones) or other forms of devices such as devices that may incorporate sensors for measuring user biosignals but are not necessarily worn. In additions, they may be incorporated into any form of textile article. Textile articles may include upholstery, such as upholstery that may be positioned on pieces of furniture, vehicle seating, as wall or ceiling décor, among other examples.

BRIEF DESCRIPTION OF THE DRAWINGS

Examples of the present disclosure will now be described with reference to the accompanying drawings, in which:

FIGS. 8 and 9 show perspective views of the electronics module of FIG. 7;

FIG. 10 shows a perspective view of a component of a garment according to aspects of the present disclosure;

FIG. 11 shows a perspective view of the electronics module of FIGS. 8 and 9 mounted on the garment of FIG. 10;

DETAILED DESCRIPTION

Figure 1:
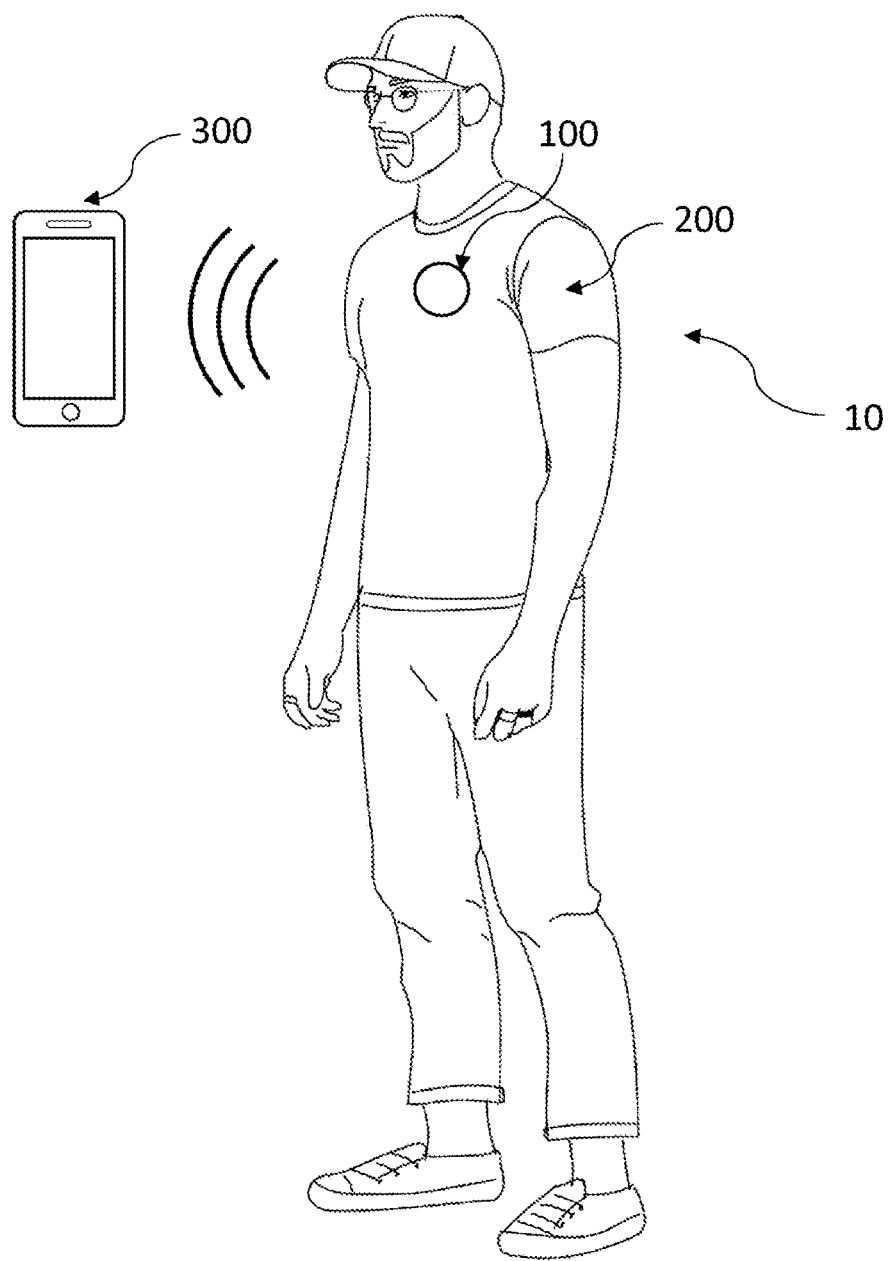
FIG. 1 shows a schematic diagram for an example system according to aspects of the present disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise.

"Wearable article" as referred to throughout the present disclosure may refer to any form of electronic device which may be worn by a user such as a smart watch, necklace, bracelet, or glasses. The wearable article may be a textile article. The wearable article may be a garment. The garment may refer to an item of clothing or apparel. The garment may be a top. The top may be a shirt, t-shirt, blouse, sweater, jacket/coat, or vest. The garment may be a dress, brassiere, shorts, pants, arm or leg sleeve, vest, jacket/coat, glove, armband, underwear, headband, hat/cap, collar, wristband, stocking, sock, or shoe, athletic clothing, swimwear, wetsuit or drysuit The wearable article/garment may be constructed from a woven or a non-woven material. The wearable article/garment may be constructed from natural fibres, synthetic fibres, or a natural fibre blended with one or more other materials which can be natural or synthetic. The yarn may be cotton. The cotton may be blended with polyester and/or viscose and/or polyamide according to the particular application. Silk may also be used as the natural fibre. Cellulose, wool, hemp and jute are also natural fibres that may be used in the wearable article/garment. Polyester, polycotton, nylon and viscose are synthetic fibres that may be used in the wearable article/garment. The garment may be a tight-fitting garment. Beneficially, a tight-fitting garment helps ensure that the sensor devices of the garment are held in contact with or in the proximity of a skin surface of the wearer. The garment may be a compression garment. The garment may be an athletic garment such as an elastomeric athletic garment.

The following description refers to particular examples of the present disclosure where the wearable article is a garment. It will be appreciated that the present disclosure is not limited to garments and other forms of wearable article are within the scope of the present disclosure as outlined above.

Referring to FIG. 1, there is shown an example system 10 according to aspects of the present disclosure. The system 10 comprises an electronics module 100, a garment 200, and a mobile device 300. The garment 200 is worn by a user. The electronics module 100 is attached to the garment 200. The electronics module 100 is arranged to integrate with electronic components incorporated into the garment 200 so as to obtain signals from the electronic components. The electronics components may comprise components of sensors. The electronics components may comprise electrodes. The electronics module 100 is further arranged to wirelessly communicate data to the mobile device 300. Various protocols enable wireless communication between the electronics module 100 and the mobile device 300. Example communication protocols include Bluetooth®, Bluetooth® Low Energy, and near-field communication (NFC).

The electronics module 100 may be removable from the garment 200. The electronics module 100 may be configured to be releasably mechanically coupled to the garment 200. The mechanical coupling of the electronics module 100 to the garment 200 may be provided by a mechanical interface such as a clip, a plug and socket arrangement, etc. The mechanical coupling or mechanical interface may be configured to maintain the electronics module 100 in a particular orientation with respect to the garment 200 when the electronics module 100 is coupled to the garment 200. This may be beneficial in ensuring that the electronics module 100 is securely held in place with respect to the garment 200 and/or that any electronic coupling of the electronics module 100 and the garment 200 (or a component of the garment 200) can be optimized. The mechanical coupling may be maintained using friction or using a positively engaging mechanism, for example.

Beneficially, the removable electronics module 100 may contain all of the components required for data transmission and processing such that the garment 200 only comprises the sensor components and communication pathways. In this way, manufacture of the garment 200 may be simplified. In addition, it may be easier to clean a garment 200 which has fewer electronic components attached thereto or incorporated therein. Furthermore, the removable electronics module 100 may be easier to maintain and/or troubleshoot than embedded electronics. The electronics module 100 may comprise flexible electronics such as a flexible printed circuit (FPC). The electronics module 100 may be configured to be electrically coupled to the garment 200.

It may be desirable to avoid direct contact of the electronics module 100 with the wearer's skin while the garment 200 is being worn. It may be desirable to avoid the electronics module 100 coming into contact with sweat or moisture on the wearer's skin. The electronics module 100 may be provided with a waterproof coating or waterproof casing. For example, the electronics module 100 may be provided with a silicone casing. It may further be desirable to provide a pouch or pocket in the garment to contain the electronics module 100 in order to prevent chafing or rubbing and thereby improve comfort for the wearer. The pouch or pocket may be provided with a waterproof lining in order to prevent the electronics module 100 from coming into contact with moisture.

Figure 2:
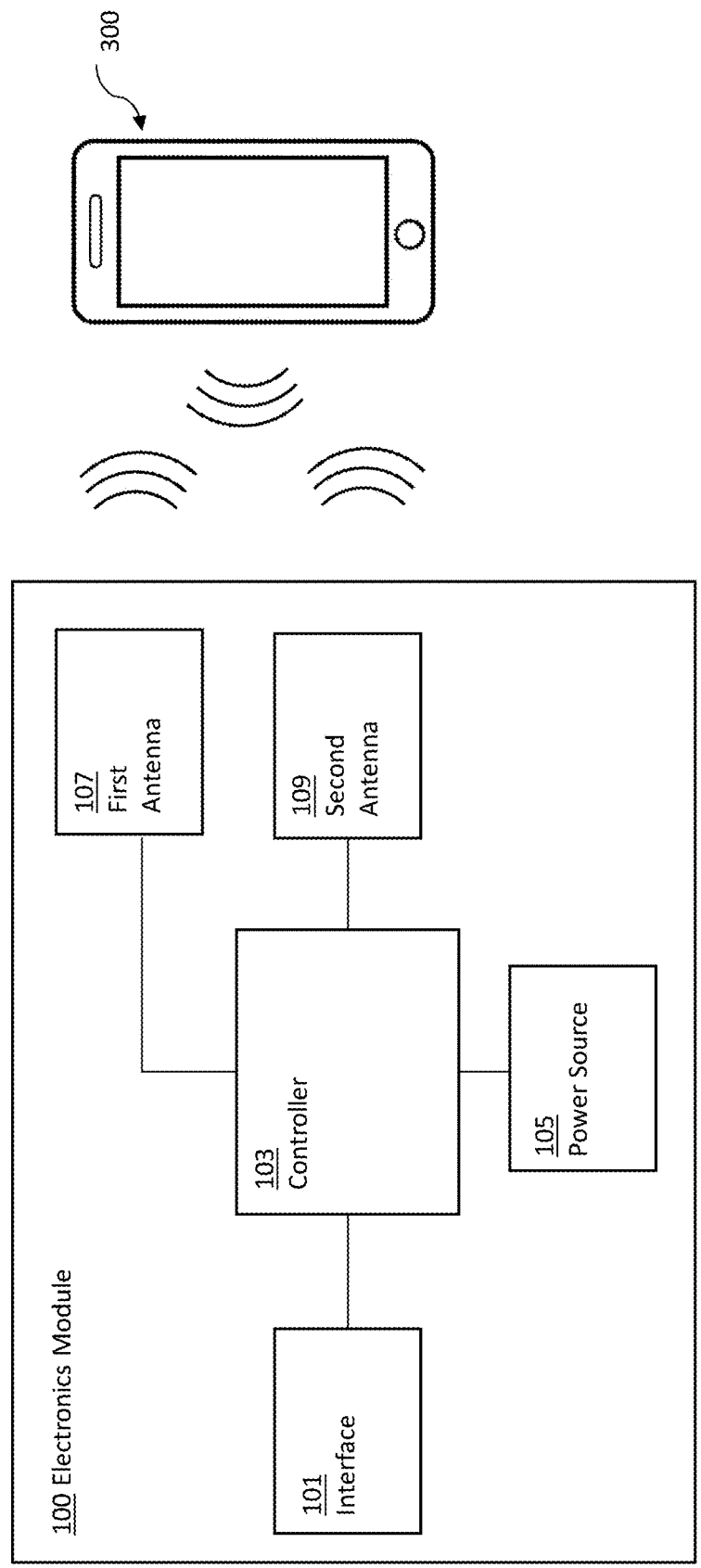
FIG. 2 shows a schematic diagram for an example electronics module according to aspects of the present disclosure.

Referring to FIG. 2, there is shown a schematic diagram of an example of the electronics module 100 of FIG. 1. The electronics module 100 is shown in wireless communication with mobile device 300. The electronics module 100 comprises an interface 101, a controller 103, a power source 105, a first antenna 107, and a second antenna 109.

The interface 101 is arranged to communicatively couple with an electronics arrangement of the wearable article 200 (FIG. 1) so as to receive a signal from the electronics arrangement. The controller 103 is communicatively coupled to the interface 101 and is arranged to receive the signals from the interface 101. The interface 101 may form a conductive coupling or a wireless (e.g. inductive) communication coupling with the electronics components of the wearable article.

The power source 105 is coupled to the controller 103 and is arranged to supply power to the controller 103. The power source 105 may comprise a plurality of power sources. The power source 105 may be a battery. The battery may be a rechargeable battery. The battery may be a rechargeable battery adapted to be charged wirelessly such as by inductive charging. The power source 105 may comprise an energy harvesting device. The energy harvesting device may be configured to generate electric power signals in response to kinetic events such as kinetic events performed by a wearer of the garment. The kinetic event could include walking, running, exercising or respiration of the wearer. The energy harvesting material may comprise a piezoelectric material which generates electricity in response to mechanical deformation of the converter. The energy harvesting device may harvest energy from body heat of a wearer of the garment. The energy harvesting device may be a thermoelectric energy harvesting device. The power source may be a super capacitor, or an energy cell.

The first antenna 107 is arranged to communicatively couple with the mobile device 300 over a first wireless communication protocol. The first wireless communication protocol may be a near field communication (NFC) protocol but is not limited to any particular communication protocol. The second antenna 109 is arranged to communicatively couple with the mobile device 300 over a second wireless communication protocol. The second wireless communication protocol may be a Bluetooth® protocol or a Bluetooth® Low Energy protocol but is not limited to any particular communication protocol.

In an example operation, the mobile device 300 is brought into proximity with the electronics module 100. In response to this, the first antenna 107 is triggered to transmit information to the mobile device 300 over the first wireless communication protocol. Beneficially, this means that the act of the mobile device 300 approaching the electronics module 100 energizes the first antenna 107 to transmit the information to the mobile device 300. This provides a simple and intuitive mechanism for transmitting information to the mobile device 300 which does not require the user manually input the information via a user interface of the mobile device 300 for example. The electronics module 100 can be configured to energize the first antenna 107 to transmit information to the mobile device 300 over the first wireless communication protocol.

The information may comprise a unique identifier for the electronics module 100. The unique identifier for the electronics module 100 may be an address for the electronics module 100 such as a MAC address or Bluetooth® address. Beneficially, transmitting a unique identifier for the electronics module 100 removes the need for a discovery or inquiry procedure to establish a communication session under the second wireless communication protocol.

The information may comprise authentication information used to facilitate the pairing between the electronics module 100 and the mobile device 300 over the second wireless communication protocol. This means that the transmitted information is used as part of an out of band (OOB) pairing process or other similar pairing process, e.g. one that facilitates the sharing of cryptographic keys over the first wireless communication protocol.

The information may comprise application information which may be used by the mobile device to start an application on the mobile device or configure an application running on the mobile device. The application may be started on the mobile device automatically (e.g. without user input). Alternatively, the application information may cause the mobile device to prompt the user to start the application on the mobile device. The information may comprise a uniform resource identifier such as a uniform resource location to be accessed by the mobile device, or text to be displayed on the mobile device for example.

It will be appreciated that the same electronics module 100 can transmit any of the above example information either alone or in combination. The electronics module 100 may transmit different types of information depending on the current operational state of the electronics module 100 and based on information it receives from other devices such as the mobile device 300.

In some examples, the first antenna 107 is a component of a passive tag such as a passive Radio Frequency Identification (RFID) tag or Near Field Communication (NFC) tag. These tags comprise the first antenna 107 as well as a memory which stores the information, and a radio chip. The mobile device 300 is powered to induce a magnetic field in an antenna of the mobile device 300. When the mobile device 300 is placed in the magnetic field of the first antenna 107, the mobile device 300 induces current in the first antenna 107. This induced current is used to retrieve the information from the memory of the tag and transmit the same back to the mobile device 300.

A passive tag is not required in all examples. Instead, it is generally preferred that the electronics module 100 detects a mobile device 300 being brought into proximity with electronics module 100 based on factors such as through a sensor of the electronics module 100 or a current being induced in the first antenna 107. Once the electronics module 100 determines that the mobile device 300 is in proximity with the electronics module 100, the controller 103 reads the information from the memory of the controller 103 or an external memory and triggers/energizes the first antenna 107 to transmit the information. Beneficially, this approach provides greater customisability and allows for different information and dynamically changing information to be transmitted by the first antenna 107. That is, the information transmitted by the first antenna 107 can be dynamically changed. This is because the controller 103 is able to update the content stored in the memory which is not possible in a passive NFC or RFID tag. This is particularly beneficial for authentication information and as it may be desirable to change this information over time for security reasons and application information.

The unique identifier transmitted to the mobile device 300 by the first antenna 107 using the first wireless communication protocol can be used to wireless pair the electronics module 100 to the mobile device 300 for communication using the second wireless communication protocol. The first wireless communication protocol may be NFC and the second wireless communication protocol may be Bluetooth®.

In an example operation, the mobile device 300 receives the unique identifier from the electronics module 100 over the first wireless communication protocol. In response, the mobile device 300 transmits a pairing request message to the electronics module 100. The second antenna 109 of the electronics module 100 receives the paring request message from the mobile device 300. It will be appreciated that the second antenna 109 may receive the pairing request message when the mobile device 300 is no longer in proximity with the electronics module 100. This is because the second wireless communication protocol has a longer communication range than the first wireless communication protocol. The controller 103 of the electronics module 100 then processes the pairing request message and transmits a pairing response message in reply via the second antenna using the second wireless communication protocol. Pairing is then performed between the electronics module 100 and the mobile device 300. For OOB pairing, the mobile device 300 will still need to be in communication range with the electronics module 100 under the first wireless communication protocol.

In an example operation, the mobile device 300 receives the unique identifier from the electronics module 100 over the first wireless communication protocol. In response, the mobile device 300 transmits a pairing request message to the electronics module 100 over the first wireless communication protocol. The first antenna 107 of the electronics module 100 receives the paring request message from the mobile device 300. The mobile device 300 is still in proximity (e.g. near field proximity) with the electronics module 100 to enable this data exchange. The controller 103 of the electronics module 100 then processes the pairing request message and transmits a pairing response message in reply via the first antenna using the first wireless communication protocol. Pairing is then performed between the electronics module 100 and the mobile device 300. The pairing response message can comprise a passkey. The passkey may be a random code generated by the controller 103 of the electronics module 100. The random code may be a true random code or pseudorandom code for example. The controller 103 may generate the passkey in response to the mobile device 300 being brought into proximity with the electronics module 100.

Beneficially, the present disclosure provides a mechanism by which an electronics module 100 can be wirelessly paired to a mobile device 300 which minimizes or entirely removes the need for the user to manually input commands for pairing via an interface of the mobile device 300. Instead, the act of bringing the mobile device 300 into vicinity with the electronics module 100 commences the pairing operation by energizing the first antenna 107 to transmit the unique identifier and other information for pairing over the first wireless communication protocol.

Figure 3:
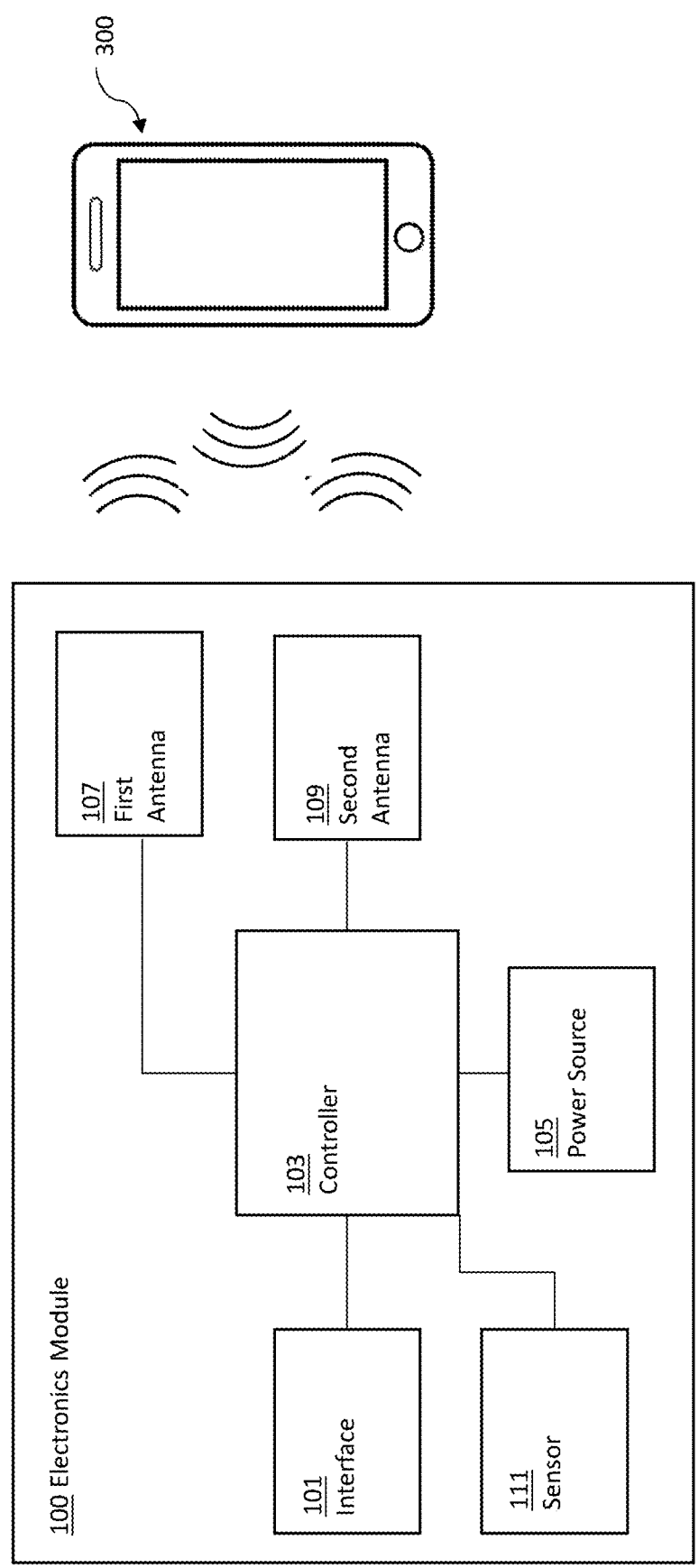
FIG. 3 shows a schematic diagram for another example electronics module according to aspects of the present disclosure.

Referring to FIG. 3, there is shown a schematic diagram of another example electronics module 100 according to aspects of the present disclosure. The electronics module 100 is shown in wireless communication with mobile device 300. The electronics module 100 comprises an interface 101, a controller 103, a power source 105, a first antenna 107, a second antenna 109 and sensor 111. The interface 101, controller 103, power source 105, first antenna 107 and second antenna 109 are the same as described in reference to FIG. 2. The sensor 111 is arranged to detect the mobile device 300 being brought into proximity with the electronics module 100. In particular, the sensor 111 is a motion sensor that is arranged to detect a displacement of the electronics module 100 caused by the mobile device being brought into proximity with the electronics module 100. These displacements of the electronics module 100 may be caused by the mobile device 300 being tapped against the electronics module 100. Physical contact between the mobile device 300 and the electronics module 100 is not required as the electronics module 100 may be in a holder such as a pocket of a wearable article. This means that there may be a fabric (or other material) barrier between the electronics module 100 and the mobile device 300. In any event, the electronics module 100 being brought into contact with the fabric of the pocket will cause an impulse to be applied to the electronics module 100 which will be sensed by the sensor 111.

The sensor 111 may comprise an inertial measurement unit. The inertial measurement unit may comprise an accelerometer and optionally one or both of a gyroscope and a magnetometer. A gyroscope/magnetometer is not required in all examples, and instead only an accelerometer may be provided or a gyroscope/magnetometer may be present but put into a low power state. A processor of the sensor 111 may perform processing tasks to classify different types of detected motion. The processor of the sensor 111 may, in particular, perform machine-learning functions so as to perform this classification. Performing the processing operations on the sensor 111 rather than the controller 103 is beneficial as it reduces power consumption, and leaves the controller 103 free to perform other tasks. In addition, it allows for motion events to be detected even when the controller 103 is operating in a low power mode. The sensor 111 communicates with the controller 103 over a serial protocol such as the Serial Peripheral Interface (SPI), Inter-Integrated Circuit (I2C), Controller Area Network (CAN), and Recommended Standard 232 (RS-232). Other serial protocols are within the scope of the present disclosure. The sensor 111 is also able to send interrupt signals to the controller 103 when required so as to transition the controller 103 from a low power model to a normal power mode when a motion event is detected. The interrupt signals may be transmitted via one or more dedicated interrupt pins.

In an example operation, the electronics module 100 is operating in a low power mode. In this low power mode, the majority of the components of the electronics module 100 are not operating so as to save power. For example, the first antenna 107 and second antenna 109 are not energized to transmit data and the controller 103 is not activated to process signal data received via the interface 101. The sensor 111 is supplied with power during the low power mode and is arranged to sense motion data. The sensor 111 may not have full functionality in the low power mode and may only have the necessary processing power to classify motion events into simple categories such as whether a tap has occurred. More computationally expensive processing operations may be disabled during the low power mode. In response to the sensor 111 detecting a tap event, the sensor 111 sends an interrupt to the controller 103. As a result, the controller 103 wakes up from the low power mode and polls the sensor 111 to determine the reason for the interrupt being sent. The sensor 111 responds with a signal indicating that a tap has been detected. The controller 103 then begins the process for controlling the first antenna 107 to transmit the unique identifier. In particular, the controller 103 reads the unique identifier from a memory of the electronics module 100 and triggers/energizes the first antenna 107 to transmit the information such as the unique identifier.

In addition to being used for triggering the first antenna 107 to transmit information, the tap detection by the sensor 111 can be used to control operations of the electronics module 100. In this way, the detected taps may replicate the basic function of a user button on existing electronics module 100. A physical button is therefore not required for the present example. A single tap may be used to wake up the electronics module or cycle through different modes of operation.

Figure 4:
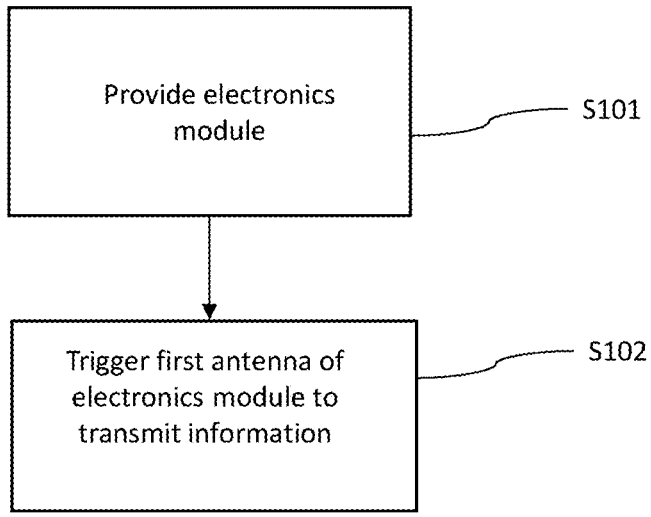
FIG. 4 shows a flow diagram for an example method according to aspects of the present disclosure.

Referring to FIG. 4, there is shown a process flow diagram for an example method according to aspects of the present disclosure. Step S101 of the method comprises providing an electronics module. The electronics module may be the electronics module of FIG. 2 or 3. Step S102 of the method comprises triggering/energizing a first antenna of the electronics module to transmit information to a mobile device over a first wireless communication protocol in response to a mobile device being brought into proximity with the electronics module.

Figure 5:
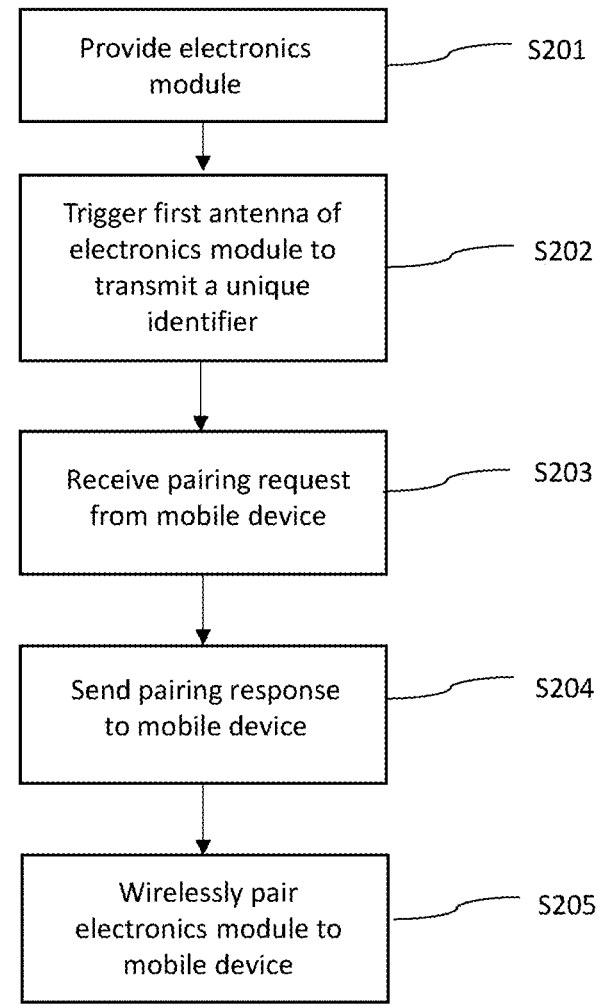
FIG. 5 shows a flow diagram for another example method according to aspects of the present disclosure.

Referring to FIG. 5, there is shown a process flow diagram for an example method according to aspects of the present disclosure. This method is for wirelessly pairing an electronics module to a mobile device over a second wireless communication protocol. Step S201 of the method comprises providing an electronics module. The electronics module may be the electronics module of FIG. 2 or 3. Step S202 of the method comprises triggering/energizing a first antenna of the electronics module to transmit a unique identifier to a mobile device over a first wireless communication protocol in response to a mobile device being brought into proximity with the electronics module. Step S203 of the method comprises receiving, via the second antenna of the electronics module, a pairing request message from the mobile device over the second wireless communication protocol. Step S204 of the method comprise transmitting a pairing response message to the mobile device via the second antenna over the second wireless communication protocol. Step S205 of the method comprises wirelessly pairing the electronics module to the mobile device over the second wireless communication protocol. Step S205 may use an out of band pairing approach which involves sharing authentication information between the electronics module and the mobile device via the first wireless communication protocol.

Figure 6:
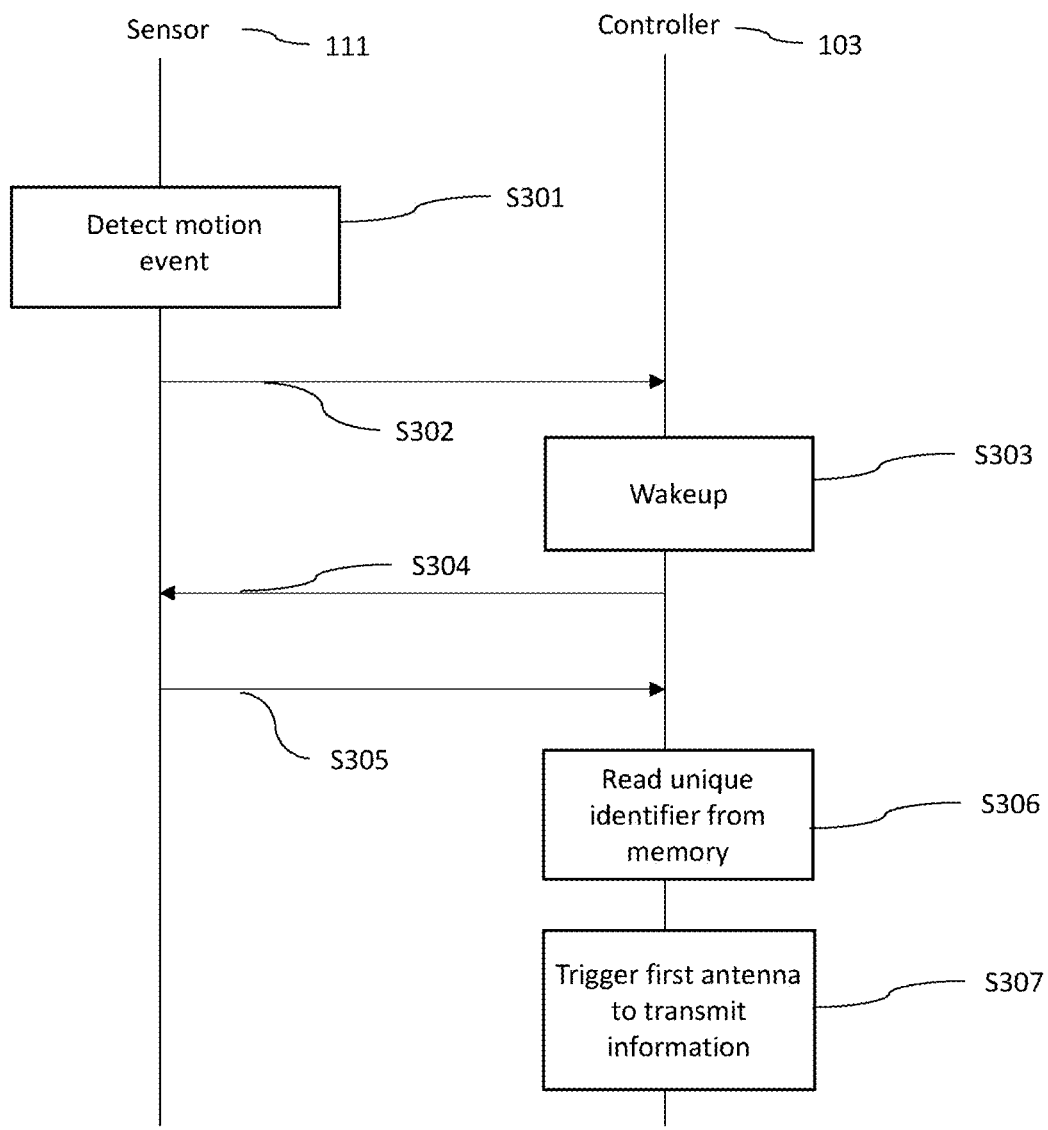
FIG. 6 shows a swim lane diagram for another example method according to aspects of the present disclosure.

Referring to FIG. 6, there is shown a swim-lane diagram showing an example interaction between the sensor 111 (FIG. 3) of the electronics module 100 and the controller 103 (FIG. 3) of the electronics module 100 prior to energizing the first antenna 107 (FIG. 3) to transmit the unique identifier (or other information). These steps may be performed in the example methods shown in FIGS. 4 and 5.

In step S301 the sensor 111 detects a motion event caused by a mobile device being brought into proximity with the electronics module 100. In step S302, the sensor 111 transmits an interrupt signal to the controller 103 over a dedicated interrupt pin. In step S303, the sensor 111 wakes-up from a low power mode in response to receiving the interrupt signal. In step S304 the controller 103 sends a status request to the sensor 111 over a serial communication interface. In step S305, the sensor 111 transmits a status response back to the controller 103 over the serial communication interface. From the status response, the controller 103 determines that a mobile device has been brought into proximity with the electronics module 100. As a result, the controller in step S306 reads the unique identifier (or other information) from a memory of the controller 103 and, in step S307 triggers the first antenna of the electronics module to transmit the unique identifier to the mobile device over the first wireless communication protocol.

The processes described above may be performed when the electronics module 100 is mounted on the garment, but this is not required in all examples of the present disclosure. That is, communication between the electronics module 100 and the garment may be performed when the electronics module is removed from the garment.

Figure 7:
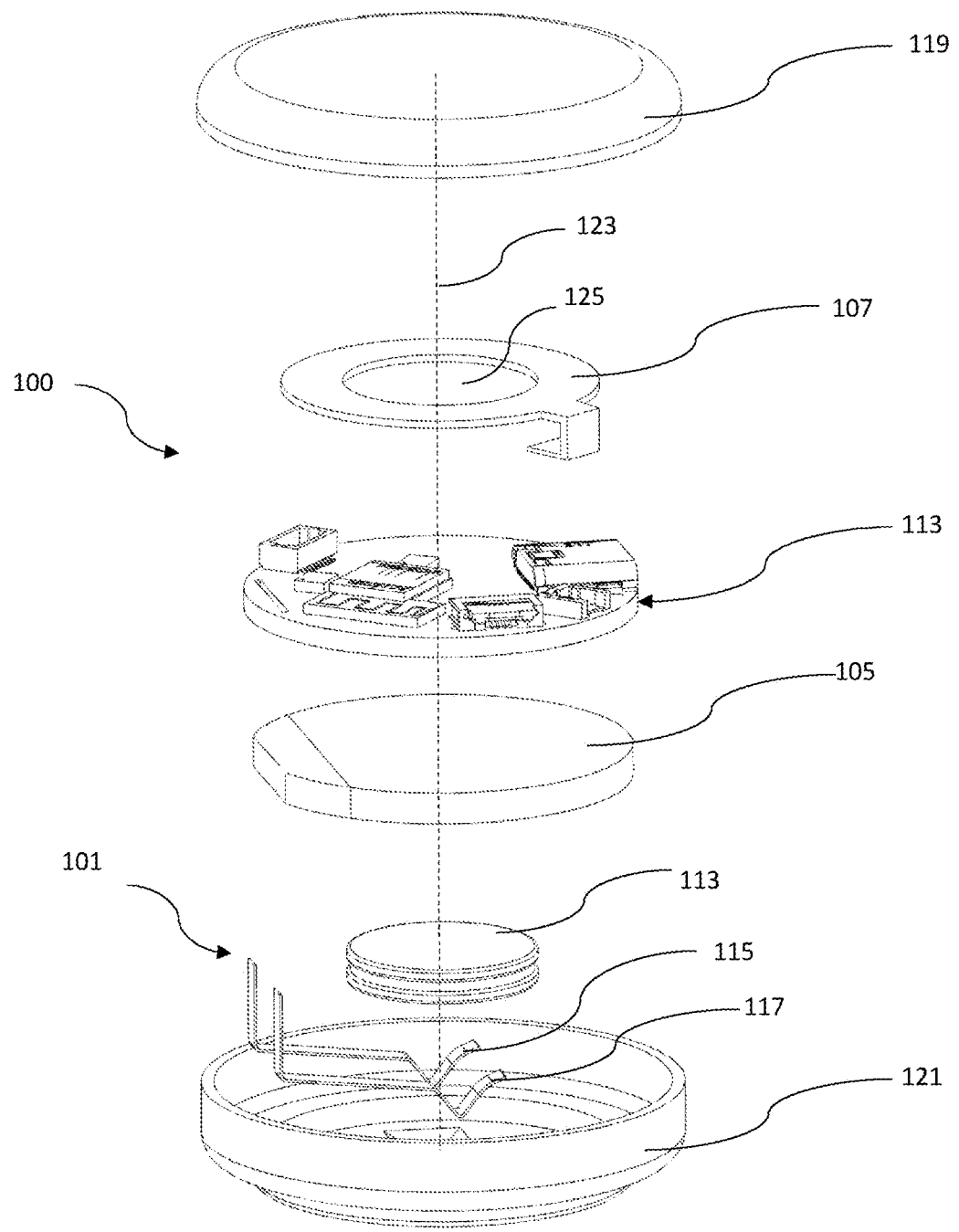
FIG. 7 shows an exploded view of yet another example electronics module according to aspects of the present disclosure.

Referring to FIG. 7, there is shown an exploded view of an example electronics module 100 according to aspects of the present disclosure. The electronics module 100 comprises a first antenna 107, printed circuit board 113, power source 105, and interface 111. The interface comprises a magnet 113, and two conductive prongs 115, 117. The electronics module 100 may be the electronics module 100 of FIG. 2 or 3, but this is not required. For example, the first antenna 107 may not be a communication antenna but may instead be a power receiving antenna such as a power receiving coil. In these examples, the first antenna 107 would be used to receive power from an external device for charging the power source 105.

The components of the electronics module 100 are provided within a housing formed of a top enclosure 119 and a bottom enclosure 121. A longitudinal axis 123 extends from the top enclosure 119 to the bottom enclosure 121. The first antenna 107 is provided proximate to the top enclosure 119. The bottom enclosure 121 is closest to the body of the wearer in use and the top enclosure 119 is furthest away from the body of the wearer in use. Beneficially, providing the first antenna 107 proximate to the top enclosure 119 minimises the communication distance between the first antenna 107 and the mobile device. This is particularly beneficial when the first antenna 107 is a short-range communication antenna 107 such as an NFC antenna 107.

The electronics module 100 may be the electronics module 100 of FIG. 2 or 3. The printed circuit board 113 may comprise the controller 103 and second antenna 109 of FIG. 2 or the controller 103, second antenna 109, and sensor 111 of FIG. 3. The first antenna 107 is spaced apart from the printed circuit board 113 and the power source 105 along the longitudinal axis 123 of the housing and is therefore spaced apart from the power source 105, controller 103, second antenna 109, and sensor 111. This further helps reduces the communication distance between the first antenna 107 and the mobile device 300.

The first antenna 107 comprises an aperture 125. That is, the first antenna 107 has an annular shape with a central aperture 125. The second antenna 109 (FIGS. 2 and 3) and the first antenna 107 are arranged such that the second antenna 109 has line of sight through the aperture 125. This means that the second antenna 109 is positioned on the printed circuit board 113 at a central position which is aligned with the aperture 125 of the first antenna 107. The printed circuit board 113 may additionally comprise a light source (not shown). The light source may be positioned on the printed circuit board 113 such that it has line of sight through the aperture 125.

The housing 119, 121 has a circular cross-sectional shape in the example of FIG. 7 but this is not required. The housing may have any cross-sectional shape such as oval, square or rectangular.

In the example of FIG. 7, the first antenna 107 and the printed circuit board 113 are shown as two separate structures. This is not required in all implementations of the present disclosure. Instead, the first antenna 107 and the printed circuit board 113 may be formed from the same printed circuit board structure. This printed circuit board structure comprises a first printed circuit board on which the first antenna is provided and a second printed circuit board on which the controller and the second antenna are provided. A conductor extends from the first printed circuit board to the second printed circuit board to conductively connect the first printed circuit board to the second printed circuit board. This printed circuit board structure may be a flex-rigid printed circuit board structure. The first and second printed circuit boards are rigid components of the flex-rigid printed circuit board structure. The conductor is a flexible component of the flex-rigid printed circuit board structure. The first printed circuit board may comprise a first region bounding an aperture extending through the first printed circuit board. The first antenna may be arranged in the first region of the first printed circuit board.

Referring to FIGS. 8 and 9, there is shown an electronics module 100 according to aspects of the present disclosure. The electronics module 100 may be the same as any of the electronics modules 100 as described above in relation to FIGS. 1 to 3 and 7. The electronics module 100 comprises a housing which contains the components of the electronics module 100. The housing comprises a top enclosure 119 and a bottom enclosure 121. The bottom enclosure 121 is closest to the body of the wearer in use and the top enclosure 119 is furthest away from the body of the wearer in use. First and second conductive prongs 115, 117 extend from openings 127, 129 in the bottom enclosure 121. The first and second conductive prongs 115, 117 are able to electrically conductively connect with conductive elements provided on a textile so as to electrically conductively connect the electronics module 100 to the conductive elements of the textile. The use of conductive prongs 115, 117 to electrically conductively connect the electronics module 100 to the textile are not required in all aspects of the present disclosure. Other forms of conductive connection may be provided such as via conductive pads, studs, magnets, or pins. In addition, a conductive connection may not be required as a wireless communication connection may be formed between the electronics module 100 and electronics components of the textile to allow for data exchange between the electronics module 100 and the electronics components of the textile. In one example, the electronics module 100 comprises an NFC antenna such as an NFC coil proximate to the bottom enclosure 121 and the textile material comprises a corresponding NFC coil These NFC coils form a communicative coupling when the electronics module 100 is brought into proximity with the textile to allow for data exchange.

Referring to FIG. 10, there is shown an example textile layer of a garment 200 according to aspects of the present disclosure. The garment 200 comprises a textile material 202 and conductive elements 201, 203, 205, 207 provided on the textile material 202. The conductive elements 201, 203, 205, 207 comprise a first terminal 201 and a first electrically conductive pathway 203 that extends from the first terminal 201 to a first electrode (not shown). The first electrically conductive pathway 203 therefore electrically connects the first terminal 201 to the first electrode. The conductive elements 201, 203, 205, 207 further comprise a second terminal 205 and a second electrically conductive pathway 207 that extends from the second terminal 205 to a second electrode (not shown). The second electrically conductive pathway 207 therefore electrically connects the second terminal 205 to the second electrode. The first and second terminals 201, 205 are arranged as concentric circles. A portion of the first electrically conductive pathway 203 extends under the second terminal 205. An insulating layer (not shown) insulates the first electrically conductive pathway 203 from the second terminal 205. This is just one example arranged of electrically conductive pathways on a textile. Other arrangements such as different positioning of electrically conductive pathways, and the use of different materials are within the scope of the present disclosure. For example, the electrically conductive pathways may be formed from a conductive thread or wire. The electrically conductive pathway may be incorporated into the textile. The electrically conductive pathway may be an electrically conductive track or film. The electrically conductive pathway may be a conductive transfer. The conductive material may be formed from a fibre or yarn of the textile. This may mean that an electrically conductive materials are incorporated into the fibre/yarn. In some examples, the conductive pathways may be provided on the underside surface of the textile. In some examples, an aperture may be provided in the textile so as to allow the electronics module to conductively connect to the conductive pathways.

Referring to FIG. 11, there is shown the electronics module 100 of FIGS. 8 and 9 attached to the garment 200 of FIG. 10. The first conductive prong 115 is brought into conductive electrical contact with the first terminal 201 and the second conductive prong 117 is brought into conductive electrical contact with the second terminal 205. A magnet (FIG. 7, element 113) may be provided in the electronics module 100 and on the underside of the garment 200 so as to maintain the electronics module 100 in releasable attachment with the garment 200.

Figure 12:
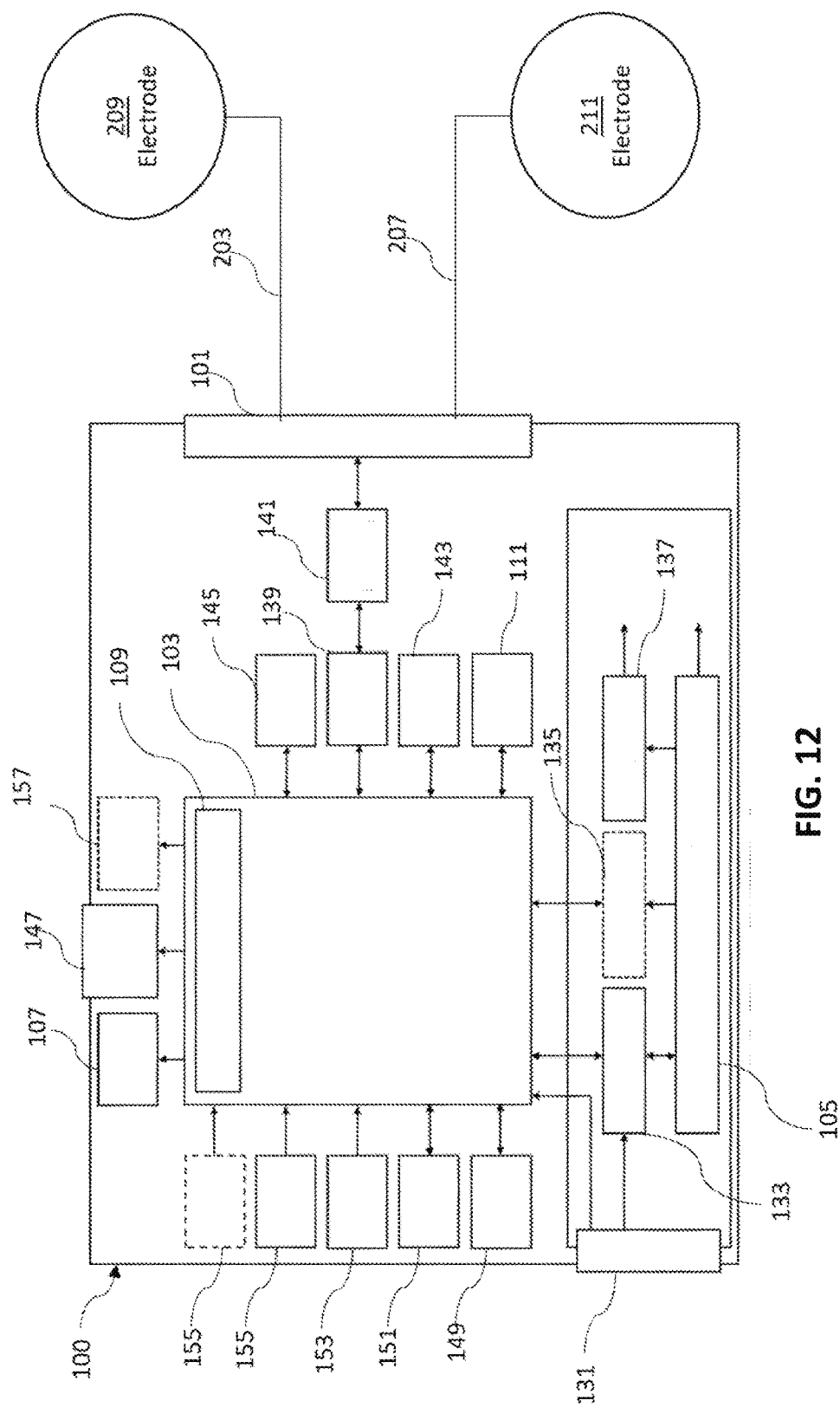
FIG. 12 shows a detailed schematic diagram of the electronics components of an example electronics module and garment according to aspects of the present disclosure.

Referring to FIG. 12, there is shown a detailed schematic diagram of an electronics module 100 according to example aspects of the present disclosure. The electronics module 100 comprises an interface 101, a controller 103, power source 105, first antenna 107, a second antenna 109, and a sensor 111. These components may be the same as the electronics module 100 described in any of FIGS. 1 to 3 and 7 to 9. The electronics module 100 is mounted on a garment and conductively connected to a first electrode 209 and a second electrode 211 of the garment via the first and second electrically conductive pathways 203, 207. In a particular example, the electrodes 209, 211 are used to measure electropotential signals such as electrocardiogram (ECG) signals.

The controller 103 is a microcontroller with an integral second antenna 109 for communication over the second wireless communication protocol. The second antenna 109 in this example is a Bluetooth® antenna 109. The controller 103 is communicatively connected to the first antenna 107 which in this example is an NFC antenna 107. The controller 103 is arranged to energize the first antenna 107 to transmit information.

The power source 105 in this example is a lithium polymer battery 105. The battery 105 is rechargeable and charged via a USB C input 131 of the electronics module 100. Of course, the present disclosure is not limited to recharging via USB and instead other forms of charging such as inductive of far field wireless charging are within the scope of the present disclosure. Additional battery management functionality is provided in terms of a charge controller 133, battery monitor 135 and regulator 147. These components may be provided through use of a dedicated power management integrated circuit (PMIC). The controller 103 is communicatively connected to the battery monitor 135 such that the controller 103 may obtain information about the state of charge of the battery 105.

The controller 103 is connected to the interface 101 via an analog-to-digital converter (ADC) fronted end 139 and an electrostatic discharge (ESD) protection circuit 141. The ADC fronted end 131 converts the raw analog signal received from the electrodes 209, 211 into a digital signal. The ADC frontend 131 may also perform filtering operations on the received signals.

The controller 103 has an internal memory and is also communicatively connected to an external memory 143 which in this example is a NAND Flash memory. The memory 143 is used to for the storage of data when no wireless connection is available between the electronics module 100 a mobile device 300 (FIG. 1). The memory 143 may have a storage capacity of at least 1 GB and preferably at least 2 GB. The electronics module 100 comprises a temperature sensor 145 and a light emitting diode 147 for conveying status information. The electronics module 100 also comprises conventional electronics components including a power-on-reset generator 149, a development connector 151, a crystal 153, and a PROG header 155. Additionally, the electronics module 100 may comprise a button 155 for allowing the user to control the electronics module 100 although this is not required due to the functionality of the motion sensor 111 as described previously. Additionally, the electronics module 100 may comprise a haptic feedback unit 157 for providing a haptic (vibrational) feedback to the user.

In some examples, the electronics module 100 may additionally comprise a mobile/cellular communicator operable to communicate the data wirelessly via one or more base stations. The communicator may provide wireless communication capabilities for the garment and enables the garment to communicate via over a cellular communication network. The cellular communication network may be a fourth generation (4G) LTE, LTE Advanced (LTE-A), LTE Cat-M1, LTE Cat-M2, NB-IoT, fifth generation (5G), sixth generation (6G), and/or any other present or future developed cellular wireless network. The first antenna 107 provided with an aperture 125 as described above in relation to FIG. 7 may be beneficial in allowing for a line-of-sight to be provided for the cellular communication of the electronics module 100.

The electronics module 100 may additionally comprise a Universal Integrated Circuit Card (UICC) that enables the garment to access services provided by a mobile network operator (MNO) or virtual mobile network operator (VMNO). The UICC may include at least a read-only memory (ROM) configured to store an MNO or VMNO profile that the garment can utilize to register and interact with an MNO or VMNO. The UICC may be in the form of a Subscriber Identity Module (SIM) card. The electronics module 100 may have a receiving section arranged to receive the SIM card. In other examples, the UICC is embedded directly into a controller of the electronics module 100. That is, the UICC may be an electronic/embedded UICC (eUICC). A eUICC is beneficial as it removes the need to store a number of MNO profiles, i.e. electronic Subscriber Identity Modules (eSIMs). Moreover, eSIMs can be remotely provisioned to garments. The electronics module 100 may comprise a secure element that represents an embedded Universal Integrated Circuit Card (eUICC).

Figure 13:
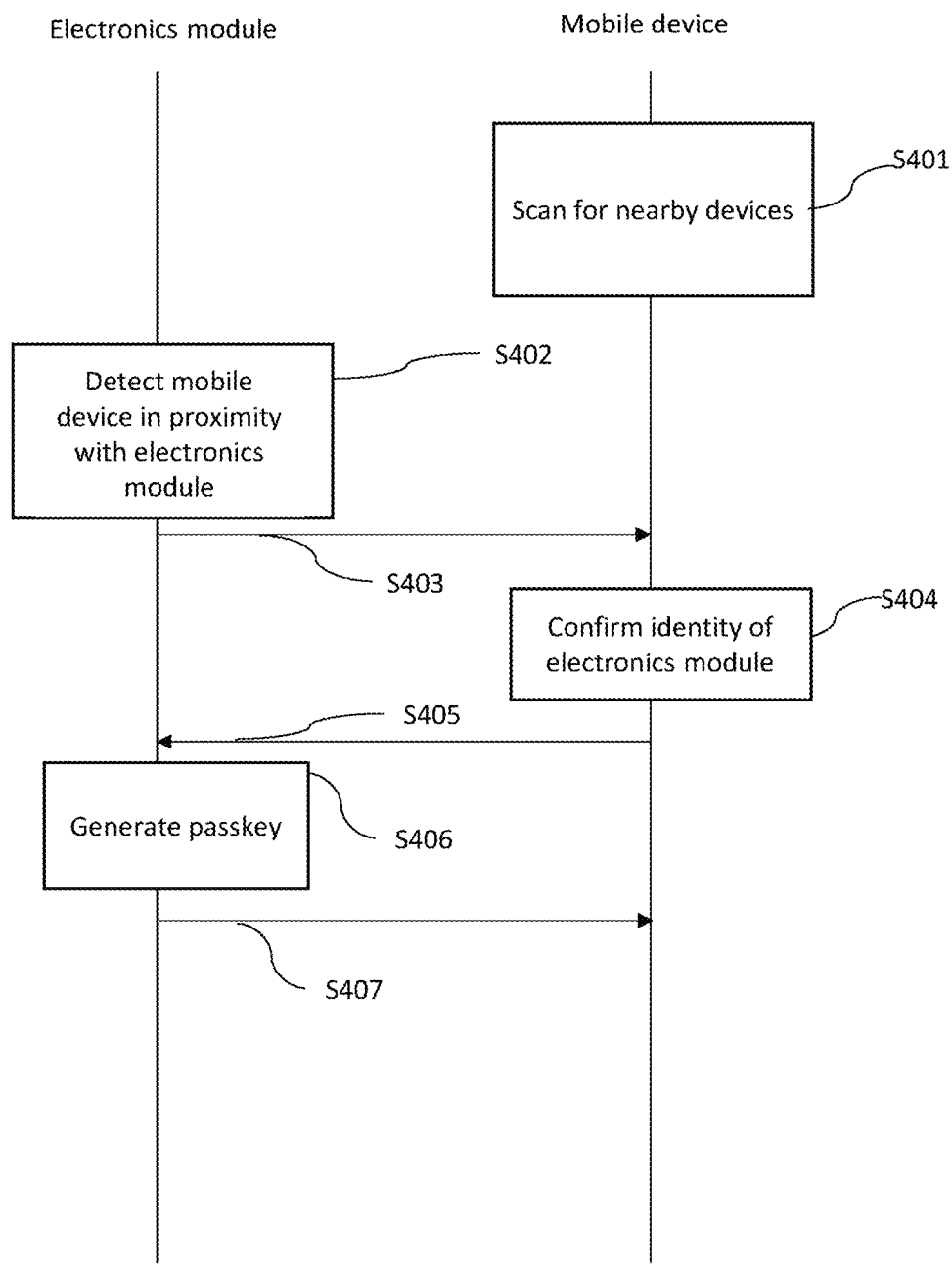
FIG. 13 shows a swim lane diagram for another example method according to aspects of the present disclosure.

Referring to FIG. 13, there is shown a swim lane flow diagram for an example method of establishing a communication session between the electronics module and the mobile device according to aspects of the present disclosure.

The electronics module may initially be operating in a low power mode such that a majority of components of the electronics module are not supplied with power. The sensor, which may be the motion sensor as referred to above, is still operating in the low power mode. The user supplies a motion stimulus event to the electronics module. The motion stimulus event is detected by the sensor which triggers the electronics module to wake up from the low power mode. That is, the electronics module transitions from a first, low power mode, to a second power mode (normal power mode) with increased power consumption.

Once in the second power mode, the electronics module reads signals received via the interface so as to determine whether the electronics module is receiving biosignals from the user. That is, the signals received via the interface are analysed to confirm that a living being is in contact with the interface. The living being may be in direct contact with the interface. That is, the skin surface of the user may be in direct contact with the interface. For example, the electronics module may be held in the user's hand to cause the interface to come into contact with the skin surface. If the electronics module is not receiving biosignals, the electronics module transitions back to the first power mode. This mechanism prevents inadvertent activation of the electronics module due to movement events.

It will be appreciated that the present disclosure is not limited to the combined used of motion detection and liveness detection to transition between power modes. Only one of the motion detection and the liveness detection may be used. Another mechanism may be used to transition the electronics module from the low power mode. For example, a user interface element such as a button of the electronics module may be used. The detection of the electromagnetic field induced by the mobile device being moved into near field proximity with the electronics module may also be used to transition the electronics module between power modes.

In the second power mode, the second antenna of the electronics module is configured to broadcast data over the second wireless communication protocol. The data broadcast over the second wireless communication protocol includes information such as an identifier for the electronics module. The identifier may be a communication address for the electronics module which can be used to identify the electronics module over the second wireless communication protocol. Activating the second antenna to broadcast information facilitates the pairing process as explained in greater detail below. Moreover, the electronics module may broadcast non-sensitive data over the second wireless communication protocol without a secure pairing process taking place. Examples of non-sensitive data include heart rate values, battery status, and electronics module version information.

In step 401, the mobile device scans for nearby devices communicating over the second wireless communication protocol. This enables the mobile device to identify devices in communication range with the mobile device that are communicating over the second wireless communication protocol and are thus candidates for establishing a (secure) communication session. The mobile device may identify manufacturer information or other forms of characteristic device information from the received identifiers to identify which of the identified devices are eligible for pairing. The mobile device may for example only consider pairing with devices having identifiers that indicate that they are from a certain manufacturer. The mobile device may automatically scan for nearby devices. A user input to trigger the scan is not necessarily required.

In step 402, the mobile device is brought into proximity with the electronics module and the electronics module detects that the mobile device has been brought into proximity such as by detecting that a current has been induced in the first antenna and/or by detecting a tap event by the motion sensor. Detecting that a current has been induced in the first antenna may be referred to as performing a field detect. These approaches are described in greater detail above. In step 403, the detection of the mobile device being brought into proximity with the electronics module triggers the first antenna to transmit information to the mobile device over the first wireless communication protocol. The information transmitted to the mobile device comprises an identifier for the electronics module. In this example, the electronics module also transmits an empty passkey. That is, a passkey has not yet been generated.

In step S404, the mobile device compares the identifier received over the first wireless communication protocol to the identifiers received over the second wireless communication protocol in step S401. The mobile device uses this to confirm that the identifier received over the first wireless communication protocol corresponds to one of the identifiers received over the second wireless communication protocol. In this way, the mobile device is able to confirm that the electronics module is also communicating over the second wireless communication protocol and thus eligible for pairing. This avoids a situation in which the mobile device attempts to establish communication with an electronics module which is able to send data over the first wireless communication protocol but is not activated to transmit data over the second wireless communication protocol (e.g. because it is still operating in the low power mode). The mobile device may also identify manufacture information or other forms of characteristic device information from the received identifier to identify whether the electronics module is eligible for pairing. The mobile device may for example only consider pairing with devices having identifiers that indicate that they are from a certain manufacturer.

In step S404, the mobile device may as a separate process send the received (unique) identifier to a server for authentication. The identifier may also have a private key associated with it. This private key may be programmed in at the electronic manufacturer factory during testing. The key may be formulated from the private kay+the unique identifier of the unit. In response to receiving the identifier, the server performs a lookup to see if the electronics module is a real electronics module associated with a particular manufacture by comparing the received identifier with an existing identifier stored on the server. The server may also check that the electronics module is not a clone of an existing module by checking whether an electronics module with the same identifier is active elsewhere. In a team sports or industrial setting (amongst others) it is likely that there will be multiple electronics modules being interchanged by people. Worker A may, for example, transfer their electronics module to Worker B at the end of their shift but Worker A's mobile device may still be paired with the electronics module. The additional server check performed when Worker B attempts to pair will essentially terminate the connection between the electronics module and Worker A's mobile device so that the electronics module and Worker A's mobile device are no longer paired.

Steps 401 and 404 are not required in all aspects of the present disclosure. For example, in situations where a limited number of devices able to communicate over the second wireless communication protocol are present, these steps may not be required, as the chances of receiving information from the wrong device over the first wireless communication protocol is minimal. Steps 401 and 404 are ideally suited for situations where several devices are present such as several electronics modules. This may occur when a team of athletes are being monitored and each are wearing a wearable article according to aspects of the present disclosure.

In step S405, if the electronics module is eligible for pairing, the mobile device transmits a pairing request to the electronics module over the first wireless communication protocol. In step S406, the electronics module generates a passkey responsive to receiving the pairing request. In this way, a default, prestored, passkey is not used by the electronics module to pair with any mobile device it encounters. Instead, a new passkey is generated for the mobile device. The generation of the passkey is triggered by the mobile device being brought into proximity with the electronics module although the generation may only occur after the pairing request is also received. This enhances the security of the communication between the electronics module and the mobile device over the second wireless communication protocol. This is important as data transmitted by the electronics module to the mobile device can include sensitive biosignal data. In step S407, the electronics module transmits the passkey to the mobile device. The electronics module and the mobile device can then complete the pairing process.

The electronics module is not required to wait for the pairing request to generate the passkey. The pairing request is not required in all examples. In response to the mobile device being brought into proximity with the electronics module, the controller may generate the passkey and transmit the passkey along with the identifier for the electronics module to the mobile device. In this example, an initial communication with an empty passkey is not performed.

During subsequent communication between the electronics module and the mobile device over the second wireless communication protocol, the data exchanged between the electronics module and the mobile device can be encrypted using the passkey. Since the passkey is exchanged between the electronics module and the mobile device over the first wireless communication protocol (a short range communication protocol) when the mobile device is in proximity with the mobile device, it is unlikely that any other devices will be in communication of the electronics module and thus able to obtain the passkey. This means that the passkey is likely only known to the electronics module and the mobile device and thus only the electronics module and the mobile device are able to easily decrypt the information exchanged between one another over the second wireless communication protocol. This enhances the security of the communication between the electronics module and the mobile device over the second wireless communication protocol. Moreover, as the passkey is generated specifically for the mobile device, a device which has previously established communication with the electronics module and thus earlier received a passkey from the electronics module, will not be able to decrypt the communication as they will not possess the required passkey.

Once the pairing process is complete, the mobile device or the electronics module may transmit a bonding message. The bonding message is typically transmitted over the second wireless communication protocol by the mobile device to the electronics module. The bonding message triggers the electronics module (or the mobile device) to save the passkey for use in future communication sessions with the mobile device (or the electronics module). In this way, a pairing process does not need to be repeated each time the electronics module wakes up from the low power mode.

In some examples, it may be desirable that the passkeys are not retained by the mobile device and the electronics module after the communication session finishes. This may be useful in the situation where many electronics modules are available for pairing with the mobile device or vice versa. In such situations, at the end of the communication session, the electronics module or the mobile device may transmit an instruction to delete the passkey so that the passkey is not retained for future communication sessions.

In the present disclosure, the electronics module may also be referred to as an electronics device or unit. These terms may be used interchangeably.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A wearable article in the form of an item of clothing, arm sleeve, leg sleeve, armband or wristband, the wearable article comprising an electronics module, the electronics module comprising:
    a controller configured to process signals received from a sensing component;
    a power source, coupled to the controller, and arranged to supply power to the controller;
    a first antenna;
    a printed circuit board structure comprising a first printed circuit board on which the first antenna is provided and a second printed circuit board on which the controller is provided; and
    a housing comprising a top enclosure and a bottom enclosure, wherein the bottom enclosure is arranged to be closer to the skin of a user than the top enclosure in use,
    wherein the power source, controller, and first antenna are provided in the housing, and wherein the first antenna is provided proximate to the top enclosure and positioned above the power source and the controller,
    wherein the first antenna comprises a power receiving antenna arranged to receive power from an external device for charging the power source.

2. The wearable article as claimed in claim 1, wherein the electronics module is further arranged to transmit information to a mobile device via the first antenna.

3. The wearable article as claimed in claim 2, wherein the electronics module is arranged to transmit information to the mobile device via the first antenna in response to the mobile device being brought into proximity with the electronics module.

4. The wearable article as claimed in claim 3, wherein the electronics module is arranged to detect the mobile device being brought into proximity with the electronics module based on a current being induced in the first antenna.

5. The wearable article as claimed in claim 4, wherein the electronics module is arranged to detect the mobile device being brought into proximity with the electronics module based on a current being induced in the first antenna.

6. The wearable article as claimed in claim 2, wherein the information comprises an identifier for the electronics module.

7. The wearable article as claimed in claim 1, wherein the first antenna comprises an aperture.

8. The wearable article as claimed in claim 1, wherein the electronics module further comprises a second antenna, wherein the first antenna is for communicating over a first wireless communication protocol, and wherein the second antenna is for communicating over a second wireless communication protocol having a longer communication range than the first wireless communication protocol.

9. The wearable article as claimed in claim 1, wherein the electronics module is arranged to be removably coupled to the wearable article.

10. The wearable article as claimed in claim 9, wherein the wearable article comprises a holder for the electronics module.

11. The wearable article as claimed in claim 10, wherein the holder comprises a pocket.

12. The wearable article as claimed in claim 11, wherein the pocket is an external pocket provided on an external surface of the wearable article.

13. The wearable article as claimed in claim 12, wherein the pocket is an internal pocket provided on an inner surface of the wearable article.

14. The wearable article as claimed in claim 1, wherein the printed circuit board structure further comprises a conductor which extends from the first printed circuit board to the second printed circuit board to conductively connect the first printed circuit board to the second printed circuit board.

15. The wearable article as claimed in claim 1, wherein the first printed circuit board is a flexible printed circuit board.

16. The wearable article as claimed in claim 1, wherein the item of clothing is one of a top, a dress, a brassiere, a pair of shorts, a pair of pants, a vest, or underwear.

17. The wearable article as claimed in claim 1, wherein the item of clothing is an item of athletic clothing.

18. The wearable article as claimed in claim 1, wherein the item of clothing is an item of compression clothing.

19. A system comprising the wearable article as claimed in claim 1, and further comprising a mobile device comprising a power transmitter, wherein the mobile device is arranged to be brought into proximity with the electronics module so as to transfer power to the power receiving antenna.

* * * * *